United States Patent
Schreck et al.

(10) Patent No.: US 12,244,722 B2
(45) Date of Patent: Mar. 4, 2025

(54) SYSTEMS AND METHODS FOR SELECTING SECURE, ENCRYPTED COMMUNICATIONS ACROSS DISTRIBUTED COMPUTER NETWORKS FOR CRYPTOGRAPHY-BASED DIGITAL REPOSITORIES IN ORDER TO PERFORM BLOCKCHAIN OPERATIONS IN DECENTRALIZED

(71) Applicant: Coinbase, Inc., San Francisco, CA (US)

(72) Inventors: Ben Schreck, San Francisco, CA (US); Ankit Chiplunkar, San Francisco, CA (US); Matt Moore, San Francisco, CA (US); Olivia Thet, San Francisco, CA (US); Peter Jihoon Kim, San Francisco, CA (US); Trevor Aron, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 565 days.

(21) Appl. No.: 17/678,938

(22) Filed: Feb. 23, 2022

(65) Prior Publication Data
US 2023/0269084 A1 Aug. 24, 2023

(51) Int. Cl.
*H04L 9/32* (2006.01)
*H04L 9/00* (2022.01)
*H04L 9/08* (2006.01)

(52) U.S. Cl.
CPC .......... *H04L 9/3236* (2013.01); *H04L 9/0825* (2013.01); *H04L 9/0894* (2013.01); *H04L 9/3247* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 2020/0051043 A1* | 2/2020 | Wilson | G06Q 20/3672 |
| 2021/0342825 A1* | 11/2021 | Le Calvez | G06F 21/554 |
| 2022/0172198 A1* | 6/2022 | Gaur | G06Q 20/3821 |
| 2022/0173893 A1* | 6/2022 | Basu | H04L 9/3247 |
| 2022/0398683 A1* | 12/2022 | Andreina | G06F 21/6245 |
| 2023/0169826 A1* | 6/2023 | Higgins | G07F 17/3244 |
| | | | 463/25 |

OTHER PUBLICATIONS

Yang, Y., Lin, H., Liu, X., Guo, W., Zheng, X. and Liu, Z., 2019. Blockchain-based verifiable multi-keyword ranked search on encrypted cloud with fair payment. IEEE Access, 7, pp. 140818-140832. (Year: 2019).*

Zhang, S. and Lee, J.H., 2019. Smart contract-based secure model for miner registration and block validation. IEEE Access, 7, pp. 132087-132094. (Year: 2019).*

* cited by examiner

*Primary Examiner* — Luu T Pham
*Assistant Examiner* — Edward X Long
(74) *Attorney, Agent, or Firm* — Foley & Lardner LLP

(57) ABSTRACT

Methods and systems are described herein for facilitating blockchain operations in decentralized applications by offering enhanced efficient when conducting blockchain operations using cryptography-based, digital ledgers through the use of specialized indexing. For example, as opposed to relying on raw blockchain data to power decentralized applications, the methods and systems use a blockchain indexer. The blockchain indexer provides a queryable record of a subset of blockchain operations.

20 Claims, 10 Drawing Sheets

SYSTEMS AND METHODS FOR SELECTING SECURE, ENCRYPTED COMMUNICATIONS ACROSS DISTRIBUTED COMPUTER NETWORKS FOR CRYPTOGRAPHY-BASED DIGITAL REPOSITORIES IN ORDER TO PERFORM BLOCKCHAIN OPERATIONS IN DECENTRALIZED

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. As one example, methods and systems are described herein for facilitating blockchain operations in decentralized applications by offering enhanced efficiency when conducting blockchain operations using cryptography-based, digital ledgers through the use of specialized indexing. For example, blockchain technology is inherently reliant on the blockchain to indicate the current state of the network (e.g., indicate the current state of transactions, smart contracts, etc.). In fact, in conventional systems, the blockchain is designated as the "true" state as the digital ledger is immutable (or practically immutable) for all blockchain operations and thus presents a perfect record of blockchain activity.

However, reliance on the blockchain to provide a record of blockchain activity and/or indicate the current state of digital assets linked to the blockchain creates technical challenges. First, the shear amount of data that needs to be parsed to identify relevant data to a given transaction presents a technical challenge. Second, irrespective of the amount of data, raw blockchain data presents a technical problem to process due to the complexity of raw code. For example, a typical blockchain operation (e.g., using the Ethereum protocol) may include lengthy, hexadecimal text strings that must be parsed and converted into a human-readable format. Due to the factors above, retrieving raw blockchain data presents a complex, technical problem with practical implications as dealing with the large amounts of data and complex conversions present significant processing and storage issues for computer systems.

These problems are only exacerbated if the blockchain is used to power a decentralized application and/or if a decentralized application relies of the blockchain when conducting operations. For example, to properly function, a decentralized application in many cases needs real-time status data for the blockchain. Even if the decentralized application may query a blockchain node, which itself requires significant processing power, the amount of data and complexity creates significant delays.

To overcome these technical deficiencies in conventional systems, methods and systems disclosed herein provide improved indexing for blockchain data. For example, as opposed to relying on raw blockchain data to power decentralized applications, the methods and systems use a blockchain indexer. The blockchain indexer provides a queryable record of a subset of blockchain operations. As the data is previously converted and efficiently indexed, the blockchain indexer allows for the real-time and near real-time status information that may be used to power decentralized application. Moreover, the blockchain indexer creates such efficiencies it can even enable the integration of digital wallets with varying key structures.

For example, through the use of the aforementioned blockchain indexer, the system may provide an interaction between a first cryptography-based, storage application (e.g., a first digital wallet) and a second cryptography-based, storage application (e.g., a second digital wallet). These cryptography-based, storage applications may comprise complex key structures such as the use of a first partial private key and a second partial private key, wherein the first partial private key is stored on a remote device, and wherein the second partial private key is stored on a user device.

In some aspects, the system may achieve these improvements through the use of specialized indexing that stores metadata points based on previously identified blockchain characteristics. For example, in some aspects, the system may receive, at a cryptography-based, indexing application, a first request to generate a queryable record of a subset of blockchain operations of a plurality of blockchain operations verified by a blockchain node, wherein the first request comprises a first criterion and a second criterion for designating the subset, wherein the first criterion corresponds to a non-fungible token standard, and wherein the second criterion corresponds to a fungible token standard, and wherein the plurality of blockchain operations comprises events recorded in a first data format that is specific to a first blockchain. The system may, in response to receiving the first request, search the plurality of blockchain operations verified by the blockchain node based on the first criterion and the second criterion. The system may receive, from the blockchain node, data in the first data format corresponding to the first criterion and the second criterion. The system may convert the data in the first data format to a second data format, wherein the second data format comprises the queryable record of the subset of blockchain operations, wherein the second data format comprises first metadata, wherein the first metadata distinguishes between the nonfungible token standard and the non-fungible token standard. The system may receive, at the cryptography-based, indexing application, a second request to search the queryable record of the subset of blockchain operations, wherein the second request comprises a user request for the non-fungible token standard. The system may, in response to the second request, generate for display, on a user interface, generating a search result based on the second request, wherein each search result is linked to a respective record in the cryptography-based, indexing application.

In some aspects, the system may also limit the amount of data that needs to be parsed from raw blockchain data by applying filtering parameters prior to parsing. For example, the system may receive, at a cryptography-based, indexing application, a first request to generate a queryable record of a subset of blockchain operations of a plurality of blockchain operations verified by a blockchain node. The system may receive, from the blockchain node, data in a first data format corresponding to verified blockchain operations for a blockchain. The system may compare a verified blockchain operation of the verified blockchain operations to a plurality of criteria to determine a respective ranking for the verified blockchain operation. The system may compare the respective ranking to a threshold ranking. The system may, in response to determining that the respective ranking corresponds to the threshold ranking, select the verified blockchain operation for the subset of blockchain operations. The system may convert a portion of the data corresponding to the verified blockchain operation from the first data format to a second data format, wherein the second data format comprises the queryable record of the subset of blockchain operations. The system may receive, at the cryptography-based, indexing application, a second request to search the queryable record of the subset of blockchain operations. The system may, in response to the second request, generate for display, on a user interface, generating a search result based on the second request.

In some aspects, the system may also use efficient blockchain node calling functions, in which a single call to a blockchain node includes multiple calls for specific blockchain operations as well as the network-imposed processing load (e.g., gas) required for each of the multiple calls. For example, the system may receive, at a cryptography-based, indexing application, a first request to query a first subset of blockchain operations of a plurality of blockchain operations verified by a blockchain node. The system may, in response to the first request, generate, for each of the first subset of blockchain operations, a respective call operation for querying the blockchain node. The system may determine, for each of the first subset of blockchain operations, a respective network-imposed processing load for the respective call operation, wherein the respective network-imposed processing load for each of the first subset of blockchain operations corresponds to a respective computational effort required to execute the respective call operation. The system may generate an aggregate call operation, wherein the aggregate call operation causes execution of the respective call operation for each of the first subset of blockchain operations. The system may determine an aggregate network-imposed processing load for the aggregate call operation, wherein the aggregate network-imposed processing load corresponds to an aggregation of the respective network-imposed processing load for each of the first subset of blockchain operations. The system may determine whether the aggregate network-imposed processing load is available. The system may, in response to determining that the aggregate network-imposed processing load is available, execute the aggregate call operation.

In some aspects, the system may also provide real-time recommendations (e.g., for use in power decentralized application) by converting raw blockchain data into a useable format. For example, the system may receive, at a cryptography-based, indexing application from a blockchain node, data, in a first data format, corresponding to a current state of a blockchain, wherein the first data format is a native format for the blockchain. The system may detect, based on parsing the data, a subset of blockchain operations of a plurality of blockchain operations verified by a blockchain node. The system may convert the data in the first data format to a second data format, wherein the second data format is native to the cryptography-based, indexing application. The system may populate a native index, for the cryptography-based, indexing application, with the data in the second data format, wherein the native index comprises a queryable record of the subset of blockchain operations. The system may, in response to populating the native index with the data in the second data format, generate for display, in a user interface, a recommendation based on the data.

In some aspects, the system may also use variable block extraction rates that are set based on dynamic conditions. By doing so, the indexer may backfill previous block serially or concurrently based on network conditions. For example, the system may retrieve, at a cryptography-based, indexing application from a blockchain node, a first block discovery routine of a plurality of block discovery routines, wherein the first block discovery routine indicates a first number of blocks of a blockchain to retrieve from a blockchain node. The system may retrieve, at the cryptography-based, indexing application from the blockchain node, first data, wherein the first data corresponds to the first number of blocks of the blockchain, and wherein the first data is in a first data format that is a native format for the blockchain. The system may convert the first data in the first data format to a second data format, wherein the second data format is native to the cryptography-based, indexing application. The system may populate a native index, for the cryptography-based, indexing application, with the first data in the second data format, wherein the native index comprises a queryable record of a subset of blockchain operations of the blockchain.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
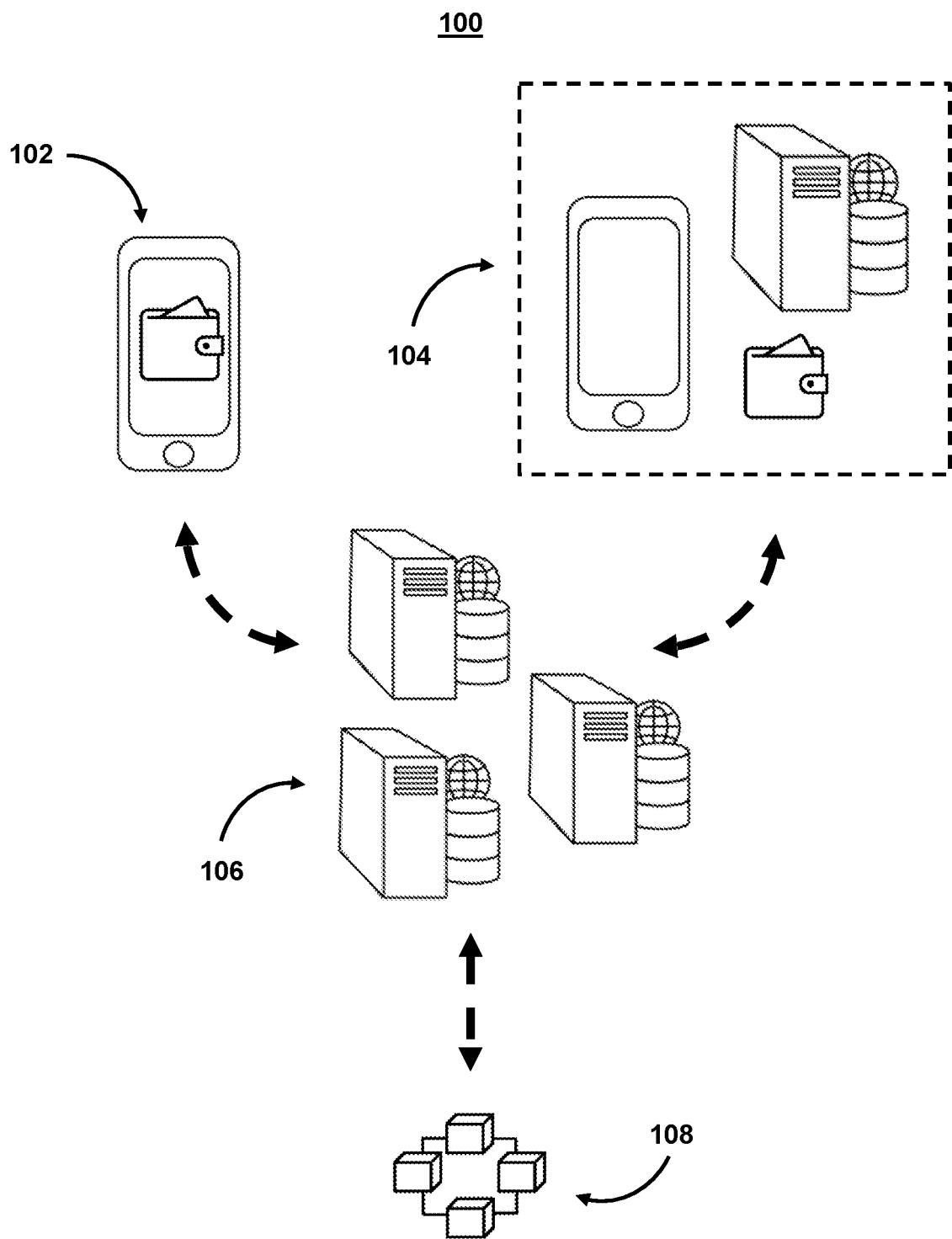
FIG. 1 shows an illustrative diagram for conducting blockchain operations using a blockchain-specific indexing system, in accordance with one or more embodiments.

FIG. 1 shows an illustrative diagram for conducting blockchain operations using a blockchain-specific indexing system, in accordance with one or more embodiments. For example, system 100 includes a first cryptography-based, storage application (e.g., digital wallet 102), wherein the first cryptography-based, storage application corresponds to a first private key, and wherein the first private key is stored on a first user device. System 100 also includes a second cryptography-based, storage application (e.g., digital wallet 104), wherein the second cryptography-based, storage application corresponds to a first partial private key and a second partial private key, wherein the first partial private key is stored on a first remote device, and wherein the second partial private key is stored on the first user device.

Digital wallet 102 and digital wallet 104 may interact with a decentralized application (e.g., implemented on a user device hosting digital wallet 102 and/or with backend services provided by a remote server hosting digital wallet 104) as well as platform 106. Platform 106 may include an indexing application that includes a block listener. The block listener may monitor blockchain node 108. The block listener at platform 106 may publish blocks, transfer logs, and/or other blockchain events (e.g., for use by the decentralized application). Additionally or alternatively, the block listener may save blocks, transfer logs to a database of an indexing application. The indexing application may therefore allow digital wallet 102 and digital wallet 104 to read blocks, transaction histories, etc. from the database.

Figure 2:
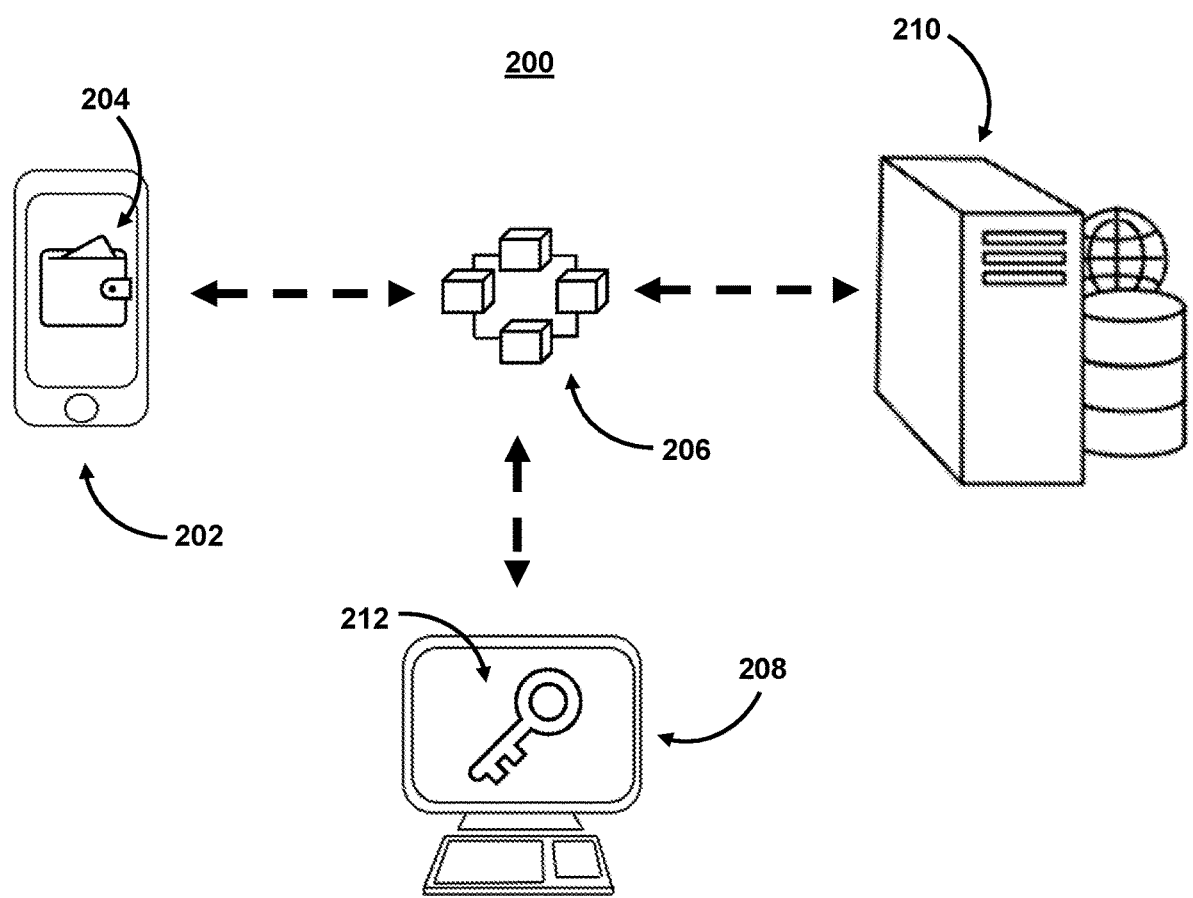
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used with cryptography-based digital repositories in order to perform blockchain operations in decentralized applications in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to perform blockchain operations, and the user interface may display content related to perform blockchain operations. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules, and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to performing blockchain operations. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
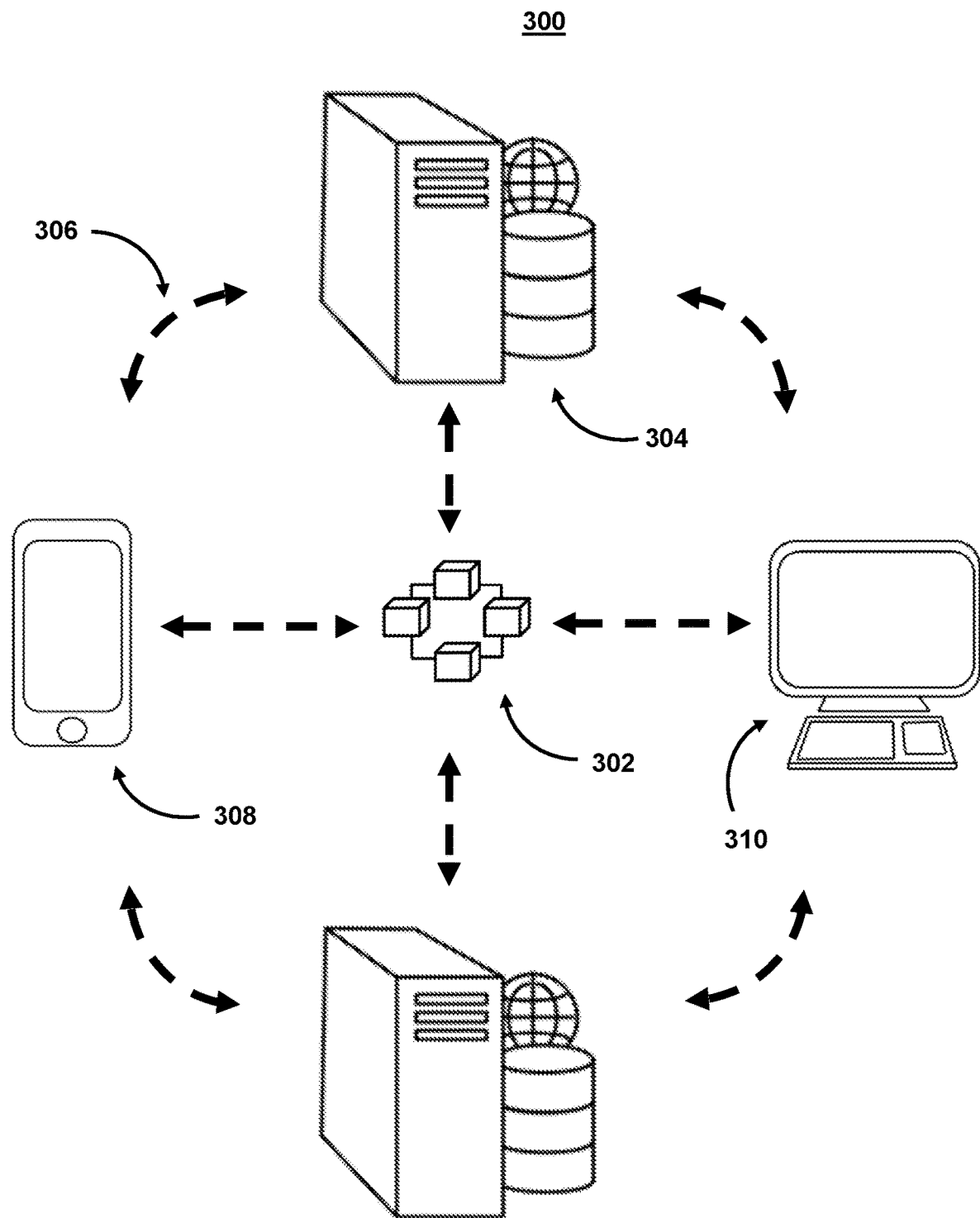
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may perform blockchain operations within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to indexing operations within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
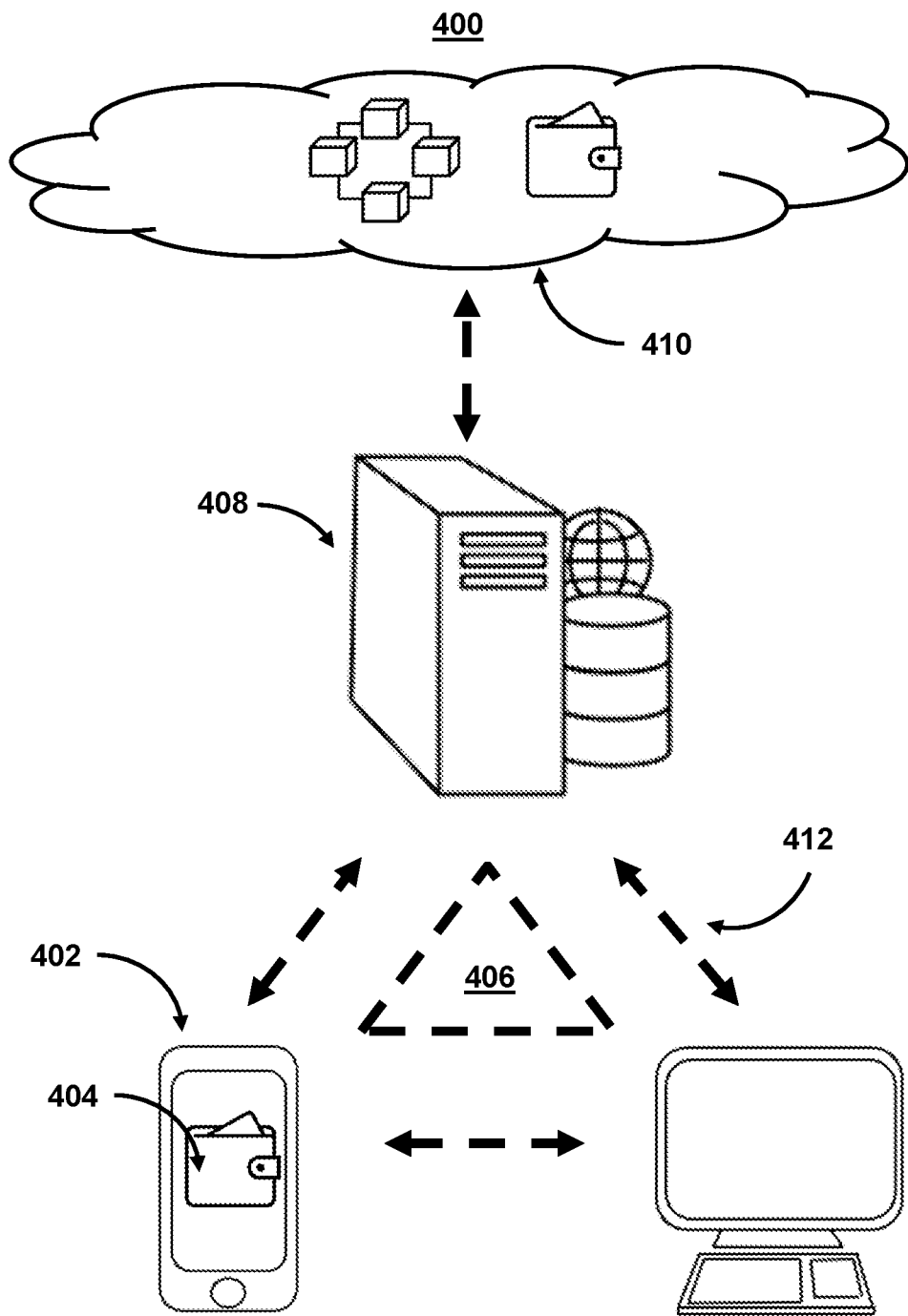
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to perform blockchain operations. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate efficient indexing blockchain states. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is a strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insultation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parsable format, doing translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
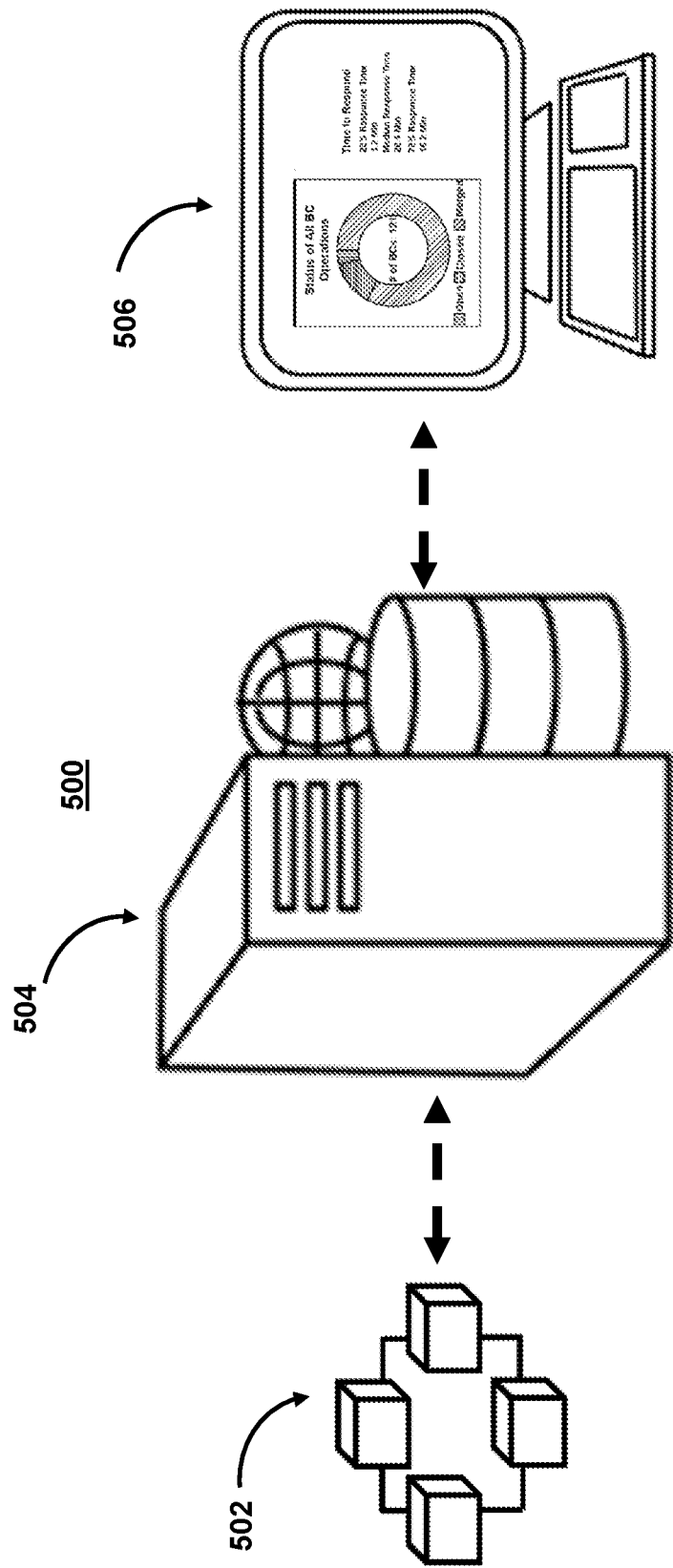
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to efficiently index blockchain states. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
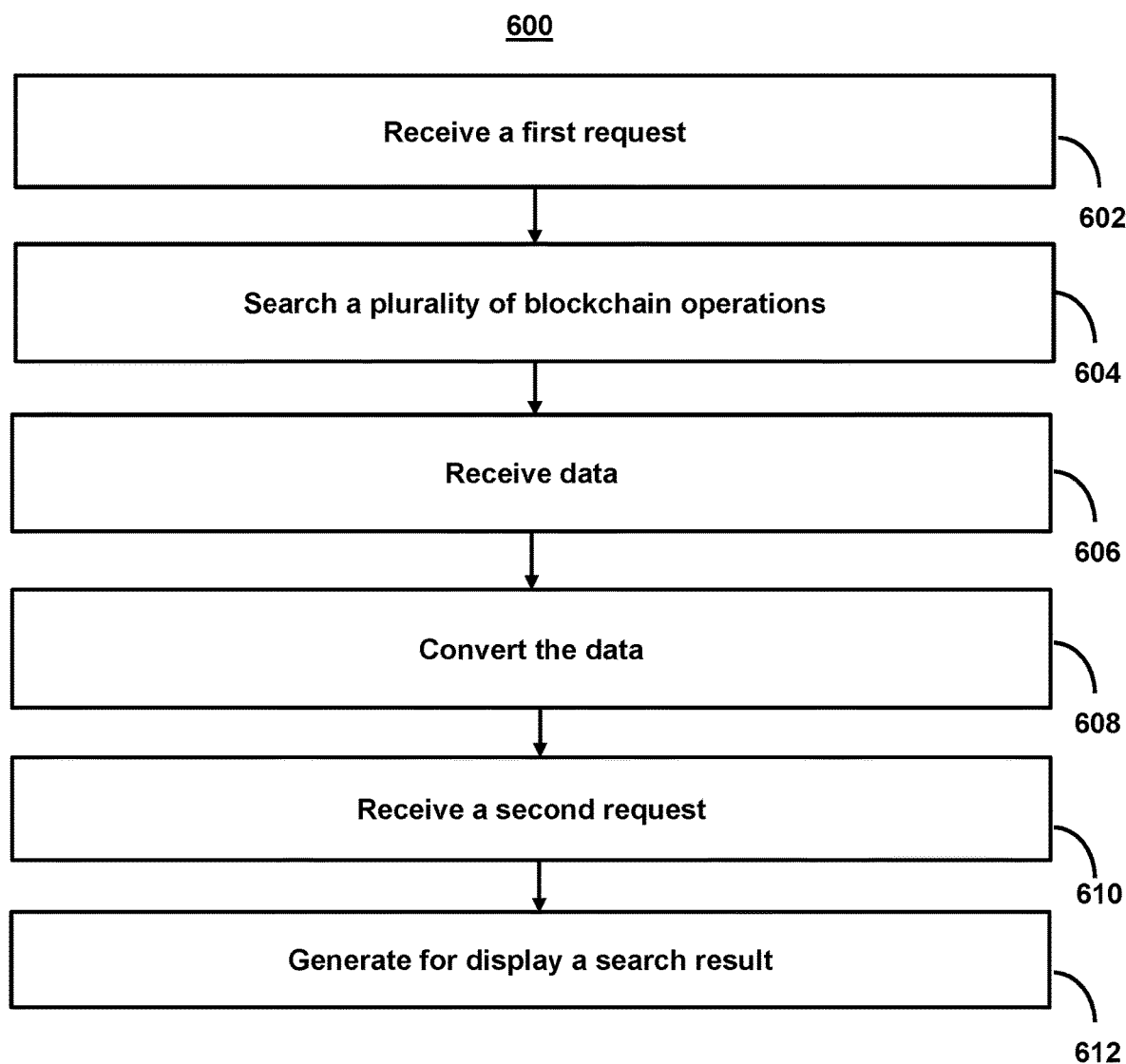
FIG. 6 shows a flowchart of the steps involved for maintaining secure, encrypted communications across distributed computer networks by linking cryptography-based digital repositories in order to perform blockchain operations in decentralized applications, in accordance with one or more embodiments.

FIG. 6 shows a flowchart of the steps involved for maintaining secure, encrypted communications across distributed computer networks by linking cryptography-based digital repositories in order to perform blockchain operations in decentralized applications, in accordance with one or more embodiments. For example, the system may use process 600 (e.g., as implemented on one or more system components described above) in order to provide secure, encrypted communications to perform blockchain operations.

For example, cryptography-based digital repositories or a cryptography-based, storage application may refer to a digital wallet. A digital wallet may comprise a software-based system that securely (and typically in an encrypted format) stores users, confidential information, personal information, payment information, and/or passwords for numerous payment methods and websites. By using a digital wallet, users can complete communications, purchases, and/or other blockchain operations easily and securely without risking the information becoming public or subject to a cyber-attack.

For example, in some embodiments, the system may comprise a first cryptography-based, storage application. The first cryptography-based, storage application may correspond to a first private key, and the first private key may be stored on a user device. For example, the first cryptography-based, storage application may be a non-custodial cryptography-based, storage application. That is, the first cryptography-based, storage application may be a separate, standalone application that allows users to store, or maintain custody of, their own crypto, and explore the decentralized web with a decentralized application browser. The first cryptography-based, storage application may be a standalone application that does not require interaction with a user account (e.g., an account from a blockchain services provider, centralized brokerage, and/or exchange). The first cryptography-based, storage application may allow users to manage their own private keys and store their crypto assets directly on their devices, not with a centralized brokerage or exchange.

As another example, in some embodiments, the system may comprise a second cryptography-based, storage application. For example, the second cryptography-based, storage application may correspond to a first partial private key and a second partial private key. For example, the first partial private key may be stored on a remote device network, and the second partial private key may be stored on the user device. For example, the second cryptography-based, storage application may be a custodial or semi-custodial cryptography-based, storage application. That is, the second cryptography-based, storage application may be a separate, standalone application that allows users to store, or maintain custody of, their own crypto, and explore the decentralized web with a decentralized application browser through an application provided by a blockchain services provider, centralized brokerage, and/or exchange. The second cryptography-based, storage application may be an application that requires interaction with a user account from a blockchain services provider, centralized brokerage, and/or exchange. The second cryptography-based, storage application may allow users to have their private keys managed by the blockchain services provider, centralized brokerage, and/or exchange without storing their own private keys (at least completely) and crypto assets directly on their devices.

In yet another example, the system may comprise a blockchain node. For example, the blockchain node may verify batches of blockchain operations. Each batch of the batches may comprise a plurality of blockchain operations involving the first cryptography-based, storage application and the second cryptography-based, storage application.

At step 602, process 600 (e.g., using one or more components described above) may receive a first request. For example, the system may receive, at a cryptography-based, indexing application, a first request to generate a queryable record of a subset of blockchain operations of a plurality of blockchain operations verified by a blockchain node. For example, the first request may comprise a first criterion and a second criterion for designating the subset. For example, the first criterion may correspond to a non-fungible token standard, and the second criterion may correspond to a fungible token standard. For example, the plurality of blockchain operations may comprise events recorded in a first data format that is specific to a first blockchain.

For example, in some blockchain protocols (e.g., Ethereum), assets are also grouped into fungibles and non-fungibles. Fungible assets are represented by tokens (e.g., ERC20 tokens) that represent ownership in projects, vouchers redeemable for services, staking tokens, or governance tokens. Non-fungible assets are represented by unique tokens (e.g., ERC721 tokens) that are not mutually interchangeable. Whether or not a token is fungible is based on the particular standard used. However, many blockchain networks (e.g., Ethereum) were not built to distinguish between fungible and non-fungible tokens, hence the need for different standards. Accordingly, these blockchain networks do not inherently distinguish between fungible, non-fungible, or other standards as tokens. To the blockchain (e.g., Ethereum), various tokens are simply just variables defined in numerous smart contracts.

As another example, raw blockchain data may present a technical problem to indexing due to the complexity of raw code. For example, a typical blockchain operation (e.g., using the Ethereum protocol) may include lengthy, hexadecimal text strings that must be parsed and converted into a human-readable format.

In some embodiments, the first criterion may be selected based on a token standard. For example, the system may determine that a user account comprises assets in the non-fungible token standard. The system may then, in response to determining that the user account comprises the assets in the non-fungible token standard, select the first criterion. For example, the system may select a specific subset of blockchain operations to record based on whether or not user accounts have assets of that type.

In some embodiments, the first criterion may be selected based on a share of user accounts. For example, the system may determine a share of user accounts that comprise assets in the non-fungible token standard. The system may then compare the share to a threshold share. The system may then, in response determining that the share corresponds to the threshold share, select the first criterion. For example, the system may select a specific subset of blockchain operations to record based on whether or not a given share of user accounts have assets of that type.

In some embodiments, the first criterion may be selected based on a number of blockchain operations. For example, the system may determine a number of blockchain operations for a user account that comprise assets in the non-fungible token standard. The system may then compare the number to a threshold number. The system may then, in response determining that the number corresponds to the threshold number, select the first criterion. For example, the system may select a specific subset of blockchain operations to record based on whether or not a given number of blockchain operations (e.g., for a given time period) have assets of that type.

At step 604, process 600 (e.g., using one or more components described above) may search a plurality of blockchain operations. For example, the system may, in response to receiving the first request, search the plurality of blockchain operations verified by the blockchain node based on the first criterion and the second criterion. In some embodiments, the cryptography-based, indexing application may search the plurality of blockchain operations.

In some embodiments, searching the plurality of blockchain operations may comprise generating a filtering parameter. For example, the system may generate a first call to the blockchain node. For example, the first call may comprise a filtering parameter based on the first criterion and the second criterion. The system may then, in response to the first call, receive a first response from the blockchain node. For example, the first response may comprise the data, corresponding to the filtering parameter, in the first data format. The system may generate a GRPC call that includes one or more text strings. The text strings may comprise call operations that are written in the first data format.

As another example, the system may generate a filtering parameter based on one or more criteria. The filtering parameter may be written in a code corresponding to the first data format, whereas the criteria are written in a different format. For example, while the parameters of a blockchain may be configured after creating a chain or while running a chain, the system may not have access rights to do so. As such, the system may need to configure calls in a data format native to the blockchain. In such cases, the system may retrieve parameters from a params.dat file for each blockchain. Typically, once the blockchain is initialized, most of these parameters cannot be changed. However, some blockchains allow for modifications. If so, to prevent accidental modification, the system may generate a hash of the parameters being added to params.dat when the chain starts running. When new nodes attempt to connect to an existing blockchain, the nodes may first download a minimal set of blockchain parameters from the existing node, and write them to the params.dat file in the appropriate directory. Similarly, once the system is are granted permission to connect, the system may download the full set of blockchain parameters (e.g., using a "getblockchainparams" API call).

In some embodiments, searching the plurality of blockchain operations may comprise determining a keyword. For example, the system may retrieve a set of function selectors defined by an application binary interface for the blockchain. The system may then determine a keyword corresponding to the non-fungible token standard based on the set of function selectors. The system may then generate the first criterion based on the keyword.

For example, compliant token standards (e.g., for ERC20 and ERC721 tokens) emit specific transfer events as logs when transfers occur in a transaction (or other blockchain operations). The system may parse the events for information such as: from whom, to whom, and how much (e.g., for ERC20) or which tokenId (e.g., for ERC721). However, in some instances, token standards for a given blockchain protocol may emit similar transfer events (e.g., as in the case of ERC20 and ERC721 tokens). Therefore, the system may use a combination of factors to determine the correct type of contract and/or whether to return a blockchain operation as part of a subset based on a request. These include checking an interface (e.g., ERC165 interface in Ethereum), determining components of a blockchain operations that are optionally implemented in one standard (e.g., for ERC721) but not implemented in another (e.g., for ERC20), including 'tokenURI( )', 'tokenOfOwnerByIndex( )', 'tokenByIndex( )'.

In some embodiments, retrieving the set of function selectors may comprise transmitting a call. For example, the system may transmit a call to a destination address with a first predetermined input. The system may then determine the set of function selectors based on the response to the call. For example, to distinguish between two token standards on a blockchain protocol, the system may check a blockchain interface. Each blockchain may have a specific interface. Therefore, the system may first determine an interface for a given blockchain. In some embodiments, the system may staticcall to a destination address with input data based on a particular interface likely to be used. If the call fails, the destination contract is determined not to implement the given interface (e.g., ERC-165 for Ethereum). If the call returns true, a second call is made with additional input data to verify the interface (e.g., the set of function selectors defined by an application binary interface for the blockchain).

In some embodiments, searching the plurality of blockchain operations may comprise generating the first criterion based on a blockchain component. For example, the system may retrieve a blockchain component for the blockchain. For example, the blockchain component may be specific to the non-fungible token. The system may then generate the first criterion based on the blockchain component. For example, different blockchain standards corresponding to the same blockchain protocol may support different blockchain components. For example, in Ethereum some methods are optionally implemented for ERC721 but not implemented for ERC20, including 'tokenURI( )', 'tokenOfOwnerByIndex( )', 'tokenByIndex( )'.

In some embodiments, searching the plurality of blockchain operations may comprise generating the second criterion based on the blockchain component. For example, the system may determine a blockchain component for the blockchain. For example, the blockchain component may be specific to the fungible token as different blockchain standards corresponding to the same blockchain protocol may support different blockchain functions. For example, in Ethereum the 'decimals( )' and 'allowance' methods are optionally implemented for ERC20, but is not in the ERC721 spec.

In some embodiments, determining the blockchain component may comprise determining whether the blockchain component provides division of a token. For example, the system may determine whether the blockchain component provides division of a token. The system may then, in response to determining that the blockchain component provides division of the token, select the blockchain component as specific to the fungible token. For example, in Ethereum the 'decimals( )' method determines how divisible a token is. If this component or method is not found, the token is not divisible.

At step 606, process 600 (e.g., using one or more components described above) may receive data. For example, the system may receive, from the blockchain node, data in the first data format corresponding to the first criterion and the second criterion. In some embodiments, the cryptography-based, indexing application may receive the data in the first data format.

At step 608, process 600 (e.g., using one or more components described above) may convert the data. For example, the system may convert the data in the first data format to a second data format. For example, the second data format may comprise the queryable record of the subset of blockchain operations. For example, the second data format may comprise first metadata, where the first metadata distinguishes between the non-fungible token standard and the non-fungible token standard. In some embodiments, the cryptography-based, indexing application may convert the first data format to the second data format.

In some embodiments, the first metadata may be stored. The system may generate the first metadata in the second data format. For example, the first metadata may indicate a blockchain standard corresponding to a token. The system may then store the first metadata at the cryptography-based, indexing application as an additional data field in a columnar database.

For example, the system may store blocks that contain metadata, links to prior blocks, and blockchain operation receipts. The metadata and prior block hash may be stored by the system in a blocks table. Each blockchain operation may be stored in an operations table as a single row, with a foreign key link to the blocks table. This transaction row may contain a data field, potentially containing redundant information overlapping with an indexed transactions table (e.g., for an internal state). The system may parse the blockchain operation and blockchain operation receipt logs (specifically the data field) to determine whether specific standards (e.g., tokens such as ERC20 or ERC721) were subject to a blockchain operation. The system may record each transfer event by writing to a unique row in the indexed transactions table. In some embodiments, the system may further convert the index to a columnar database. For example, a columnar database is a column-oriented storage for database. The system may use this orientation in order to improve the speed of data retrieval of data columns, for example for analytical applications. The use of the columnar format (as opposed to a row-based format) significantly reduces the overall disk I/O requirements and limits the amount of data the system needs to load.

At step 610, process 600 (e.g., using one or more components described above) may receive a second request. For example, the system may receive, at the cryptography-based, indexing application, a second request to search the queryable record of the subset of blockchain operations. For example, the second request may comprise a user request for the non-fungible token standard.

At step 612, process 600 (e.g., using one or more components described above) may generate for display a search result. For example, the system may, in response to the second request, generate for display, on a user interface, a search result based on the second request. For example, each search result may be linked to a respective record in the cryptography-based, indexing application. In some embodiments, the cryptography-based, indexing application may generate for display, in the user interface, the search result. In order to maintain updated search results the system may maintain a pointer that links a search result to a specific index entry that may be used to link a search result to a record. In some embodiments, depending on the updating procedure of the index, the search results may reflect blockchain operations that may not yet have been verified by the blockchain node.

In some embodiments, generating the search result may comprise modifying the search result. For example, the system may retrieve the respective record, at the cryptography-based, indexing application, for the search result. The system may then compare the respective record to an internal state of the cryptography-based, indexing application for the respective record. For example, the internal state of the cryptography-based, indexing application may comprise an independent ledger for the blockchain that is specific to the cryptography-based, indexing application. The system may then modify the search result based on the internal state.

For example, the system may log each new discovered block, each blockchain operation, each blockchain-specific transfer event, etc. independently. The system may then allow downstream application to query the index as opposed to the blockchain node. The system may then allow applications to subscribe to the index, as opposed to manually calling a blockchain node upon each request. By subscribing to the index, applications like cryptography-based, storage application can update their internal state to reflect the current state of a blockchain in real time without needing to poll a blockchain node. This eliminates wasted computation cycles on polling when no new data has arrived.

In some embodiments, comparing the respective record to the internal state of the cryptography-based, indexing application may comprise determining whether to modify the search result based on a retention time. For example, the system may determine a retention time for the internal state. The system may then compare the retention time to a threshold retention time. The system may then determine whether to modify the search result based on the internal state in response to the retention time being below the threshold retention time.

For example, the system may use real-time streaming data pipelines and applications that adapt to the data streams for messaging, storing, and/or stream processing to allow storage and analysis of both historical and real-time data to generate the internal state of the index. To ensure reliability for the internal state, the system may set an explicit retention time that may be based on rules in a log. The log may set guidelines such as retention times for internal states as well as when subscribed applications may have data automatically pushed (e.g., to update a search result).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
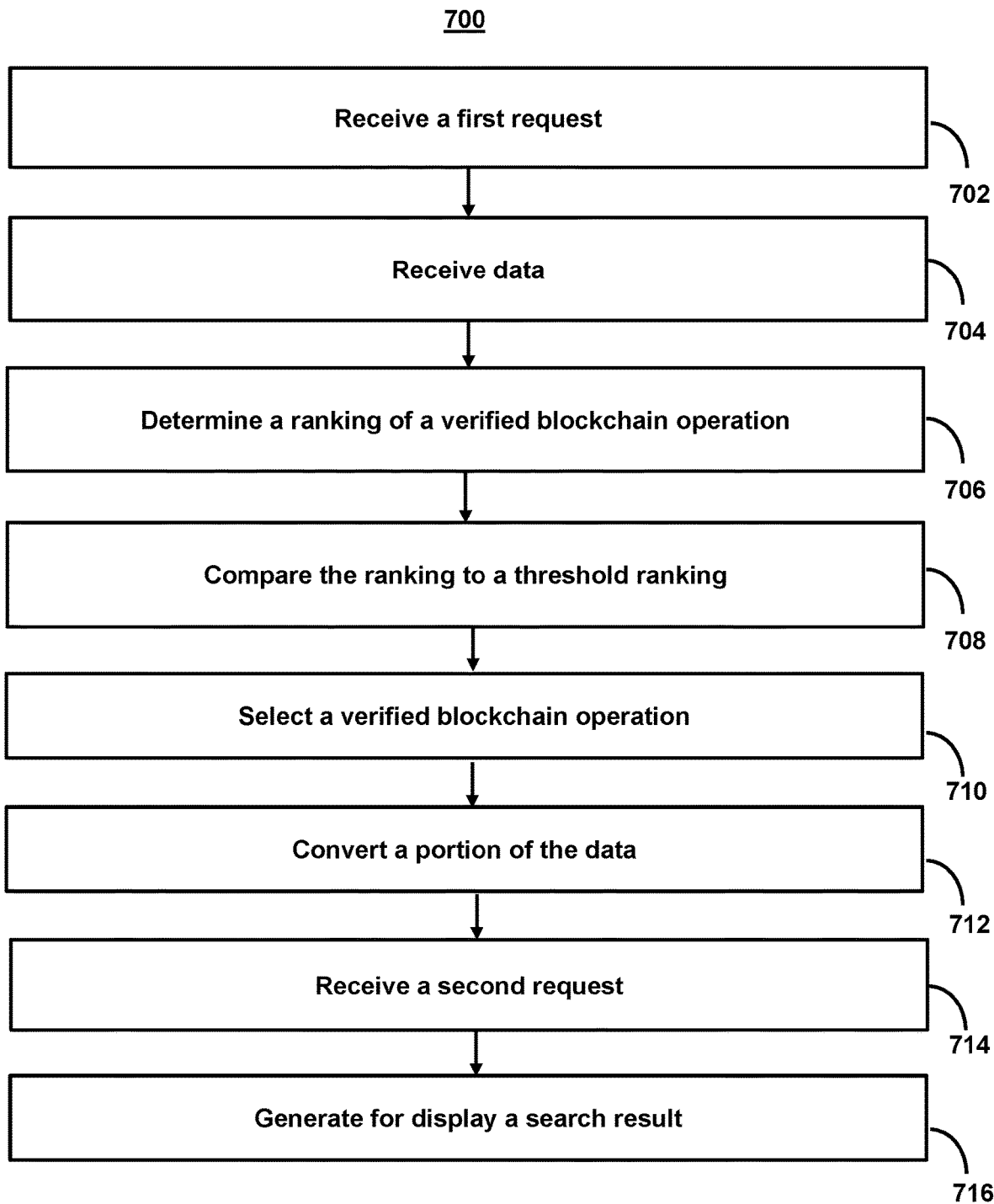
FIG. 7 shows a flowchart of steps involved for selecting secure, encrypted communications across distributed computer networks for cryptography-based, digital repositories in order to perform blockchain operations in decentralized applications, in accordance with one or more embodiments, in accordance with one or more embodiments.

FIG. 7 shows a flowchart of steps involved for selecting secure, encrypted communications across distributed computer networks for cryptography-based, digital repositories in order to perform blockchain operations in decentralized applications, in accordance with one or more embodiments. For example, the system may use process 700 (e.g., as implemented on one or more system components described above) in order to select secure encrypted communications to perform blockchain transactions.

For example, cryptography-based digital repositories or a cryptography-based, storage application may refer to a digital wallet. A digital wallet may comprise a software-based system that securely (and typically in an encrypted format) stores users, confidential information, personal information, payment information, and/or passwords for numerous payment methods and websites. By using a digital wallet, users can complete communications, purchases, and/or other blockchain operations easily and securely without risking the information becoming public or subject to a cyber-attack.

For example, in some embodiments, the system may comprise a first cryptography-based, storage application. The first cryptography-based, storage application may correspond to a first private key, and the first private key may be stored on a user device. For example, the first cryptography-based, storage application may be a non-custodial cryptography-based, storage application. That is, the first cryptography-based, storage application may be a separate, standalone application that allows users to store, or maintain custody of, their own crypto, and explore the decentralized web with a decentralized application browser. The first cryptography-based, storage application may be a standalone application that does not require interaction with a user account (e.g., an account from a blockchain services provider, centralized brokerage, and/or exchange). The first cryptography-based, storage application may allow users to manage their own private keys and store their crypto assets directly on their devices, not with a centralized brokerage or exchange.

As another example, in some embodiments, the system may comprise a second cryptography-based, storage application. For example, the second cryptography-based, storage application may correspond to a first partial private key and a second partial private key. For example, the first partial private key may be stored on a remote device network, and the second partial private key may be stored on the user device. For example, the second cryptography-based, storage application may be a custodial or semi-custodial cryptography-based, storage application. That is, the second cryptography-based, storage application may be a separate, standalone application that allows users to store, or maintain custody of, their own crypto, and explore the decentralized web with a decentralized application browser through an application provided by a blockchain services provider, centralized brokerage, and/or exchange. The second cryptography-based, storage application may be an application that requires interaction with a user account from a blockchain services provider, centralized brokerage, and/or exchange. The second cryptography-based, storage application may allow users to have their private keys managed by the blockchain services provider, centralized brokerage, and/or exchange without storing their own private keys (at least completely) and crypto assets directly on their devices.

In yet another example, the system may comprise a blockchain node. For example, the blockchain node may verify batches of blockchain operations. For example, each batch of the batches may comprise a plurality of blockchain operations involving the first cryptography-based, storage application and the second cryptography-based, storage application.

At step 702, process 700 (e.g., using one or more components described above) may receive a first request. For example, the system may receive, at a cryptography-based, indexing application, a first request to generate a queryable record of a subset of blockchain operations of a plurality of blockchain operations verified by a blockchain node.

At step 704, process 700 (e.g., using one or more components described above) may receive data. For example, the system may receive, from the blockchain node, data in a first data format. For example, the data in the first data format may correspond to verified blockchain operations for a blockchain. In some embodiments, the cryptography-based, indexing application may receive the data.

At step 706, process 700 may determine a ranking of a verified blockchain operation. For example, the system may compare a verified blockchain operation of the verified blockchain operations to a plurality of criteria to determine a respective ranking for the verified blockchain operation. In some embodiments, the cryptography-based, indexing application may compare the verified blockchain operation to the plurality of criteria.

For example, given the exponentially large amount of blockchain operations that may be verified by a given blockchain node, the system may use a plurality of criteria (e.g., weighting criteria) to determine which verified blockchain operations to record in a cryptography-based, indexing application.

In some embodiments, a number of criteria may be determined. For example, the system may determine a rate at which new blocks are being added to the blockchain. The system may then determine a number of criteria in the plurality of criteria based on the rate. For example, the system may adjust the threshold ranking and/or the number of criteria that are used to determine whether a blockchain operation is selected based on the rate at which new blocks are added. The system may do this in order to keep pace with blockchain updates at a node and ensure that the cryptography-based, indexing application is current.

In some embodiments, determining the respective ranking for the verified blockchain operation may comprise generating a filtering parameter. For example, the system may generate a first call to the blockchain node. For example, the first call may comprise a filtering parameter for the verified blockchain operation. For example, the system may generate a GRPC call that includes one or more text strings. The text strings may comprise call operations that are written in the first data format. The system may then, in response to the first call, receive a first response from the blockchain node. For example, the first response may comprise the data, corresponding to the filtering parameter, in the first data format.

For example, the system may generate a filtering parameter based on one or more criteria. The filtering parameter may be written in a code corresponding to the first data format, whereas the criteria are written in a different format. For example, while the parameters of a blockchain may be configured after creating a chain or while running a chain, the system may not have access rights to do so. As such, the system may need to configuring calls in a data format native to the blockchain. In such cases, the system may retrieve parameters from a params.dat file for each blockchain. Typically, once the blockchain is initialized, most of these parameters cannot be changed. However, some blockchains allow for modifications. If so, to prevent accidental modification, the system may generate a hash of the parameters being added to params.dat when the chain starts running. When new nodes attempt to connect to an existing blockchain, the nodes may first download a minimal set of blockchain parameters from the existing node, and write them to the params.dat file in the appropriate directory. Similarly, once the system is are granted permission to connect, the system may download the full set of blockchain parameters (e.g., using a "getblockchainparams" API call).

In some embodiments, determining the respective ranking for the verified blockchain operation may comprise determining whether the verified blockchain transaction comprises a keyword. For example, the system may retrieve a set of function selectors defined by an application binary interface for the blockchain. The system may then determine a keyword based on the set of function selectors. The system may then determine whether the verified blockchain operation comprises the keyword.

For example, compliant token standards (e.g., for ERC20 and ERC721 tokens) emit specific transfer events as logs when transfers occur in a transaction (or other blockchain operations). The system may parse the events for information such as: from whom, to whom, and how much (e.g., for ERC20) or which tokenId (e.g., for ERC721). However, in some instances, token standards for a given blockchain protocol may emit similar transfer events (e.g., as in the case of ERC20 and ERC721 tokens). The parsed information may comprise keywords (e.g., variable length text strings) that may be used by the system to determine whether or not a given blockchain operation corresponds to a given interface. The system may then determine how to rank the verified blockchain operation based on the interface it uses.

In some embodiments, determining the respective ranking for the verified blockchain operation may comprise determining a blockchain component. For example, the system may retrieve a blockchain component for the blockchain. For example, the blockchain component may be specific to a given standard. The system may then determine whether the verified blockchain operation comprises the blockchain component.

For example, different blockchain standards corresponding to the same blockchain protocol may support different blockchain components. For example, in Ethereum some methods are optionally implemented for ERC721 but not implemented for ERC20, including 'tokenURI( )', 'tokenOfOwnerByIndex( )', 'tokenByIndex( )'. The system may then determine how to rank the verified blockchain operation based on the components it has.

In some embodiments, determining the respective ranking for the verified blockchain operation may comprise determining divisibility of a token. For example, the system may determine a blockchain component that enable division of a token. The system may then determine whether the verified blockchain operation comprises the blockchain component. For example, in Ethereum the 'decimals( )' component determines how divisible a token is. A standard that is non-fungible (e.g., ERC721) does not have this component. If this component is not found, the token is not divisible and thus not part of this standard. The system may then determine how to rank the verified blockchain operation based on the component.

At step 708, process 700 (e.g., using one or more components described above) may compare the ranking to a threshold ranking. For example, the system may compare the respective ranking to a threshold ranking. In some embodiments, the cryptography-based, indexing application may compare the respective ranking to the threshold ranking.

For example, in the some blockchain protocols (e.g., Ethereum), assets are also grouped into different classes (e.g., fungibles and non-fungibles). Fungible assets are represented by tokens (e.g., ERC20 tokens) that represent ownership in projects, vouchers redeemable for services, staking tokens, or governance tokens. Non-fungible assets are represented by unique tokens (e.g., ERC721 tokens) that are not mutually interchangeable. Whether or not a token is fungible is based on the particular standard used. However, many blockchain networks (e.g., Ethereum) were not built to distinguish between different standards. The system may use a plurality of criteria to determine whether a given blockchain operation corresponds to a given standard or is otherwise of interest (e.g., to a user) for indexing purposes. For example, compliant token standards (e.g., for ERC20 and ERC721 tokens) emit specific transfer events as logs when transfers occur in a transaction (or other blockchain operations). The system may parse the events for information such as: from whom, to whom, and how much (e.g., for ERC20) or which tokenId (e.g., for ERC721). However, in some instances, token standards for a given blockchain protocol may emit similar transfer events (e.g., as in the case of ERC20 and ERC721 tokens). Therefore the system may use a combination of factors to determine the correct type of contract and/or whether to return a blockchain operation as part of a subset based on a request. These include checking an interface (e.g., ERC165 interface in Ethereum), determining components of a blockchain operations that are optionally implemented in one standard (e.g., for ERC721) but not implemented in another (e.g., for ERC20), including 'tokenURI( )', 'tokenOfOwnerByIndex( )', 'tokenByIndex( )'.

In some embodiments, the threshold ranking may be based on a rate. For example, the system may determine a rate at which new blocks are being added to the blockchain. The system may then determine the threshold ranking based on the rate.

For example, the system may determine whether to raise or lower a threshold based on the rate at which the blockchain is being updated. In some embodiments, the system may throttle updates to the cryptography-based, indexing application in order to reduce processing requirements based on the updates. Alternatively or additionally, the system may have internal metrics for the amount of time in which a blockchain operation must be completed (e.g., via a decentralized application). If the blockchain is being updated rapidly, the system may delay the completion of a blockchain operation until several new blocks have been added to the blockchain; thus, ensuring that any blockchain operations originating from the decentralized application are using the correct fork.

At step 710, process 700 (e.g., using one or more components described above) may select a verified blockchain operation. For example, the system may, in response to determining that the respective ranking corresponds to the threshold ranking, select the verified blockchain operation for the subset of blockchain operations. In some embodiments, the cryptography-based, indexing application may select the verified blockchain operation for the subset of blockchain operations.

In some embodiments, the subset of blockchain operations may be selected based on standards of assets. For example, the system may determine that a user account comprises assets in a first standard. The system may then, in response to determining that the user account comprises the assets in the first standard, select a first criterion of the plurality of criteria that corresponds to the first standard. For example, the system may select the subset based on relevancy to a given account. For example, the system may select a specific subset of blockchain operations to record based on whether or not user accounts have assets of that type.

In some embodiments, the subset of blockchain operations may be selected based on a share of user accounts having assets of a standard. For example, the system may determine a share of user accounts that comprise assets of a first standard. The system may then compare the share to a threshold share. The system may then, in response determining that the share corresponds to the threshold share, select a first criterion of the plurality of criteria that corresponds to the first standard. For example, the system may select the subset based on relevancy to a given account. As such, the system may select a specific subset of blockchain operations to record based on whether or not a given share of user accounts have assets that user that standard.

In some embodiments, the subset of blockchain operations may be selected based on a number of blockchain operations having assets of a standard. For example, the system may determine a number of blockchain operations for a user account that comprise assets in of a first standard. The system may then compare the number of blockchain operations to a threshold number. The system may then, in response determining that the number of blockchain operations corresponds to the threshold number, select a first criterion of the plurality of criteria that corresponds to the first standard. For example, the system may select the subset based on relevancy to a given account. As such, the system may select a specific subset of blockchain operations to record based on whether or not a given number of blockchain operations (e.g., for a given time period) have assets of that type.

At step 712, process 700 (e.g., using one or more components described above) may convert a portion of the data. For example, the system may convert a portion of the data corresponding to the verified blockchain operation from the first data format to a second data format. For example, the second data format may comprise the queryable record of the subset of blockchain operations. In some embodiments, the cryptography-based, indexing application may convert the portion of the data corresponding to the verified blockchain operation.

At step 714, process 700 (e.g., using one or more components described above) may receive a second request. For example, the system may receive, at the cryptography-based, indexing application, a second request to search the queryable record of the subset of blockchain operations.

At step 716, process 700 (e.g., using one or more components described above) may generate for display a search result. For example, the system may, in response to the second request, generate for display, on a user interface, a search result based on the second request. In some embodiments, the cryptography-based, indexing application may generate for display, in the user interface, the search result.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
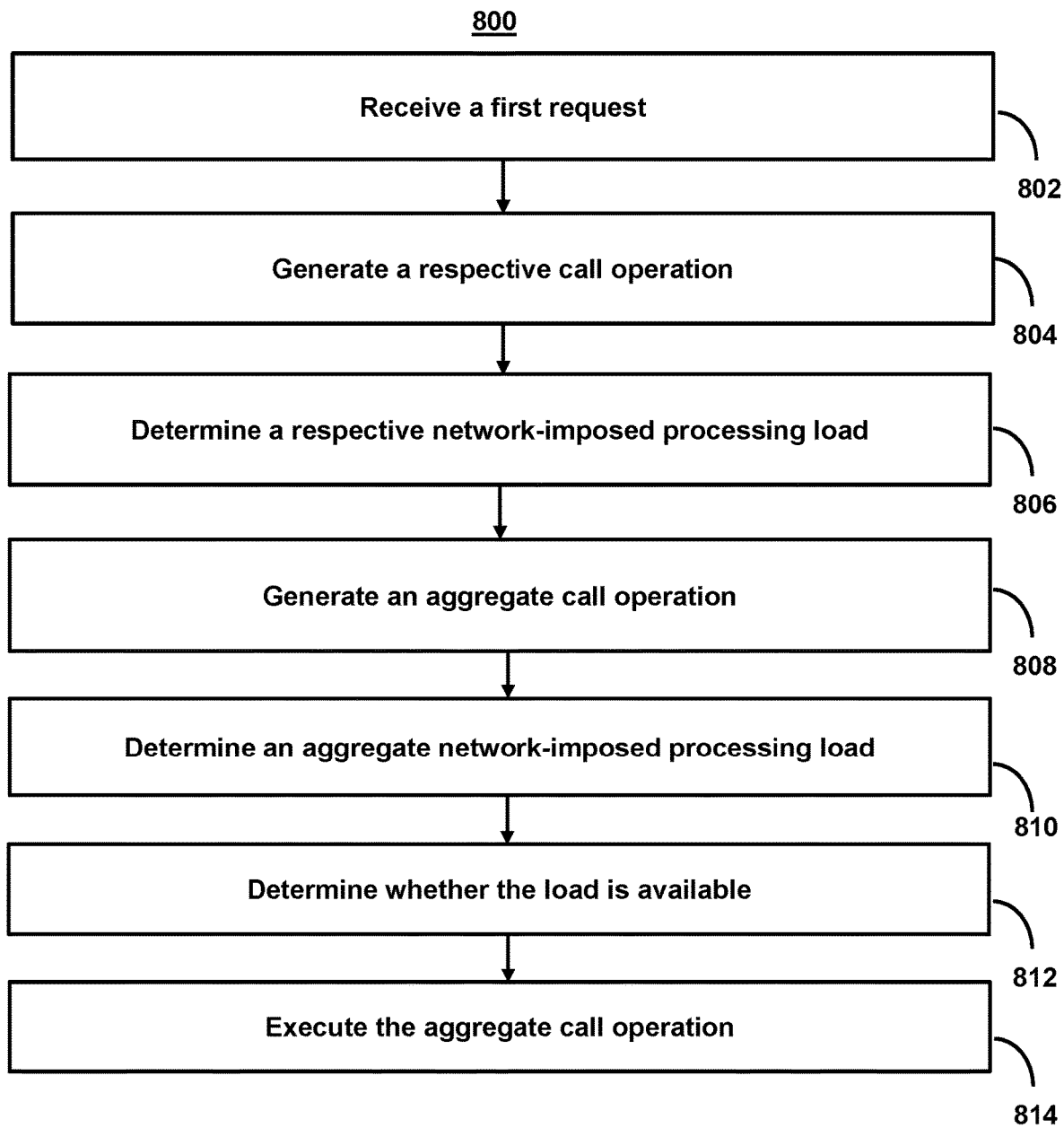
FIG. 8 shows a flowchart of steps involved for using secure, encrypted communications across distributed computer networks to efficiently update cryptography-based digital repositories for performing blockchain operations in decentralized applications, in accordance with one or more embodiments.

FIG. 8 shows a flowchart of steps involved for using secure, encrypted communications across distributed computer networks to efficiently update cryptography-based digital repositories for performing blockchain operations in decentralized applications. For example, the system may use process 800 (e.g., as implemented on one or more system components described above) in order to efficiently update cryptography-based digital repositories for performing blockchain transactions.

For example, cryptography-based digital repositories or a cryptography-based, storage application may refer to a digital wallet. A digital wallet may comprise a software-based system that securely (and typically in an encrypted format) stores users, confidential information, personal information, payment information, and/or passwords. for numerous payment methods and websites. By using a digital wallet, users can complete communications, purchases, and/or other blockchain operations easily and securely without risking the information becoming public or subject to a cyber-attack.

At step 802, process 800 (e.g., using one or more components described above) may receive a first request. For example, the system may receive, at a cryptography-based, indexing application, a first request to query a first subset of blockchain operations of a plurality of blockchain operations verified by a blockchain node. As an example, a blockchain node may verify batches of blockchain operations. For example, each batch of the batches may comprise a plurality of blockchain operations involving a first cryptography-based, storage application and a second cryptography-based, storage application.

At step 804, process 800 (e.g., using one or more components described above) may generate a respective call operation. For example, the system may, in response to the first request, generate, for each of the first subset of blockchain operations, a respective call operation for querying the blockchain node. In some embodiments, cryptography-based, indexing application may generate, for each of the first subset of blockchain operations, the respective call operation for querying the blockchain node.

For example, the system may use a call operation to determine a state of one or more blockchain operations (e.g., a smart contract). A call operation is a local invocation of a contract function that does not result in a broadcast or publishment of anything to the blockchain. The call operation may be a read-only operation and may not consume any gas. In some embodiments, the call operation may simulate what would happen in another blockchain operation (e.g., a transaction), but discards all the state changes when it is done. The call operation may be synchronous and the return value of the contract function is returned immediately.

In some embodiments, determining to query the first subset of blockchain operations may be based on a user account comprising corresponding assets. For example, the system may determine that a user account comprises assets corresponding to the first subset of blockchain operations. The system may then determine to query the first subset of blockchain operations based on determining that the user account comprises assets corresponding to the first subset of blockchain operations.

At step 806, process 800 (e.g., using one or more components described above) may determine a respective network-imposed processing load. For example, the system may determine, for each of the first subset of blockchain operations, a respective network-imposed processing load for the respective call operation. For example, the respective network-imposed processing load for each of the first subset of blockchain operations may correspond to a respective computational effort required to execute the respective call operation. In some embodiments, cryptography-based, indexing application may determine, for each of the first subset of blockchain operations, the respective network-imposed processing load for the respective call operation.

For example, a network-imposed processing load may comprise an amount of gas required for the blockchain operation. Gas may refer to a fee, or pricing value, required to successfully conduct a transaction, execute a contract, or perform another blockchain operation on the Ethereum blockchain platform. Gas may be priced in small fractions of the cryptocurrency ether, commonly referred to as gwei and sometimes also called nanoeth. The system may use gas to allocate resources of the Ethereum virtual machine (EVM) so that decentralized applications such as smart contracts can self-execute in a secured but decentralized fashion. In some embodiments, the system may determine the price of gas based on current demand.

At step 808, process 800 (e.g., using one or more components described above) may generate an aggregate call operation. For example, the system may generate an aggregate call operation. For example, the aggregate call operation may cause execution of the respective call operation for each of the first subset of blockchain operations. In some embodiments, the cryptography-based, indexing application may generate the aggregate call operation.

In some embodiments, generating the aggregate call operation may further comprise formatting a respective call. For example, the system may determine a first standard for a first blockchain operation of the first subset of blockchain operations. The system may then format a first respective call operation based on the first standard, wherein the first respective call operation corresponds to the first blockchain operation. For example, different blockchain operations may comprise different components and/or functions based on the standard used. Therefore, the system may adjust the call operations based on the standard.

In some embodiments, generating, for each of the first subset of blockchain operations, a respective call operation may comprise generating a respective filtering parameter. For example, the system may determine a respective filtering parameter for each of the first subset of blockchain operations. The system may then generate the respective filtering parameter in a first data format, wherein the first data format is specific to the blockchain.

For example, the system may generate a filtering parameter based on one or more criteria. The filtering parameter may be written in a code corresponding to the first data format, whereas the criteria are written in a different format. For example, while the parameters of a blockchain may be configured after creating a chain or while running a chain, the system may not have access rights to do so. As such, the system may need to configuring calls in a data format native to the blockchain. In such cases, the system may retrieve parameters from a params.dat file for each blockchain. Typically, once the blockchain is initialized, most of these parameters cannot be changed. However, some blockchains allow for modifications. If so, to prevent accidental modification, the system may generate a hash of the parameters being added to params.dat when the chain starts running. When new nodes attempt to connect to an existing blockchain, the nodes may first download a minimal set of blockchain parameters from the existing node, and write them to the params.dat file in the appropriate directory. Similarly, once the system is are granted permission to connect, the system may download the full set of blockchain parameters (e.g., using a "getblockchainparams" API call). As another example, raw blockchain data present a technical problem to indexing due to the complexity of raw code. For example, a typical blockchain operation (e.g., using the Ethereum protocol) may include lengthy, hexadecimal text strings that must be parsed and converted into a human-readable format.

At step 810, process 800 (e.g., using one or more components described above) may determine an aggregate network-imposed processing load. For example, the system may determine an aggregate network-imposed processing load for the aggregate call operation. For example, the aggregate network-imposed processing load may correspond to an aggregation of the respective network-imposed processing load for each of the first subset of blockchain operations. In some embodiments, the cryptography-based, indexing application may determine the aggregate network-imposed processing load for the aggregate call operation.

At step 812, process 800 (e.g., using one or more components described above) may determine whether the load is available. For example, the system may determine whether the aggregate network-imposed processing load is available. In some embodiments, the cryptography-based, indexing application may determine whether the aggregate network-imposed processing load is available.

In some embodiments, determining whether the aggregate network-imposed processing load is available may comprise accessing a first cryptography-based, storage application. For example, the system may determine an amount of fungible tokens specific to the blockchain corresponding to the aggregate network-imposed processing load. The system may then access a first cryptography-based, storage application. For example, the first cryptography-based, storage application may correspond to a first private key, and the first private key may be stored on a user device. The system may then determine whether the first cryptography-based, storage application comprises the amount of fungible tokens specific to the blockchain. The system may then, in response to determining that the first cryptography-based, storage application comprises the amount of fungible tokens specific to the blockchain, determine to execute the aggregate call operation.

For example, the first cryptography-based, storage application may be a non-custodial cryptography-based, storage application. That is, the first cryptography-based, storage application may be a separate, standalone application that allows users to store, or maintain custody of, their own crypto, and explore the decentralized web with a decentralized application browser. The first cryptography-based, storage application may be a standalone application that does not require interaction with a user account (e.g., an account from a blockchain services provider, centralized brokerage, and/or exchange). The first cryptography-based, storage application may allow users to manage their own private keys and store their crypto assets directly on their devices, not with a centralized brokerage or exchange.

In some embodiments, determining whether the aggregate network-imposed processing load is available may comprise accessing a second cryptography-based, storage application. For example, the system may determine an amount of fungible tokens specific to the blockchain corresponding to the aggregate network-imposed processing load. The system may then access a second cryptography-based, storage application. For example, the second cryptography-based, storage application may correspond to a first partial private key and a second partial private key. For example, the first partial private key may be stored on a remote device network, and the second partial private key may be stored on a user device. The system may then determine whether the second cryptography-based, storage application comprises the amount of fungible tokens specific to the blockchain. The system may then, in response to determining that the second cryptography-based, storage application comprises the amount of fungible tokens specific to the blockchain, determine to execute the aggregate call operation.

For example, the second cryptography-based, storage application may be a custodial or semi-custodial cryptography-based, storage application. That is, the second cryptography-based, storage application may be a separate, standalone application that allows users to store, or maintain custody of, their own crypto, and explore the decentralized web with a decentralized application browser through an application provided by a blockchain services provider, centralized brokerage, and/or exchange. The second cryptography-based, storage application may be an application that requires interaction with a user account from a blockchain services provider, centralized brokerage, and/or exchange. The second cryptography-based, storage application may allow users to have their private keys managed by the blockchain services provider, centralized brokerage, and/or exchange without storing their own private keys (at least completely) and crypto assets directly on their devices.

At step 814, process 800 (e.g., using one or more components described above) may execute the aggregate call operation. For example, the system may, in response to determining that the aggregate network-imposed processing load is available, execute the aggregate call operation. In some embodiments, the cryptography-based, indexing application may execute the aggregate call operation.

In some embodiments, an additional aggregate operation may be generated. For example, the system may receive at a cryptography-based, indexing application, a second request to query a second subset of blockchain operations of a plurality of blockchain operations verified by a blockchain node. The system may then, in response to the second request, generate, for each of the second subset of blockchain operations, a respective additional operation. For example, the respective additional operation may comprise a write operation. The system may then determine, for each of the second subset of blockchain operations, a respective additional network-imposed processing load for the respective additional operation. For example, the respective additional network-imposed processing load for each of the second subset of blockchain operations may correspond to a respective additional computational effort required to execute the respective additional operation. The system may then generate an additional aggregate operation. For example, the additional aggregate operation may cause execution of the respective additional operation for each of the second subset of blockchain operations. The system may then determine an additional aggregate network-imposed processing load for the additional aggregate operation. For example, the additional aggregate network-imposed processing load may correspond to an additional aggregation of the respective additional network-imposed processing load for each of the second subset of blockchain operations. The system may then determine whether the additional aggregate network-imposed processing load is available. The system may then, in response to determining that the additional aggregate network-imposed processing load is available, execute the additional aggregate operation.

For example, in contrast to the call operation, which is read-only, the system may also execute other blockchain operations such as a transaction. For example, a transaction may be broadcasted to the network, processed by miners, and if valid, may be published on the blockchain.

A write-operation may affect other accounts, update the state of the blockchain, and require gas. The write-operation may be asynchronous, because it is possible that no miners will include the transaction in a block (e.g., the gas for the transaction may be too low). Because it is asynchronous, the system may generate an immediate return value of a transaction that corresponds to the transaction's hash.

In some embodiments, determining the additional aggregate network-imposed processing load may comprise generating a simulation. For example, the system may generate generating a simulation of each of the second subset of blockchain operations. The system may then determine network-imposed processing loads for the simulation of each of the second subset of blockchain operations. For example, the system may simulate a transaction in order to determine the results of a transaction under current network conditions. To simulate a single transaction, the system may run the transaction on the EVM, executing all smart contract method calls with the specific transaction input parameters and a known state trie. The state may be represented by the current chain head—that is, the most recently agreed-upon state across the network.

By running a smart contract in this manner, the system may provide an accurate accounting of how the internal transaction will settle under current conditions. In some embodiments, the system may run the transaction against a specific chain state, and the state may not be the same as when the transaction is actually confirmed. Accordingly, the system may detect state changes and automatically re-run simulations.

In some embodiments, generating the simulation may comprise determining a pending transaction propagating through a mempool. For example, the system may determine that the blockchain node remains synced at a time of simulation. The system may then determine a pending transaction propagating through a mempool. For example, to simulate new transactions entering the mempool, the system must overcome several technical hurdles. For example, the system may determine that the blockchain node remains properly synced at the time of simulation. The system may also determine one or more pending transactions propagating through the mempool. For example, individual nodes may frequently miss pending transactions, particularly during periods of network congestion.

In some embodiments, generating the simulation may comprise simulating blockchain operations against a current block state. For example, the system may predict blockchain operations that are likely to be included in a next block. The system may then in response to determining that the first subset of blockchain operations are likely to be included in the next block, simulate the first subset of blockchain operations against a current block state. For example, in some embodiments, the system may determine which state to simulate blockchain operations against. For example, the system may determine which blockchain operations are likely to be included in the next block and should therefore be simulated against the current block state for maximum accuracy.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

Figure 9:
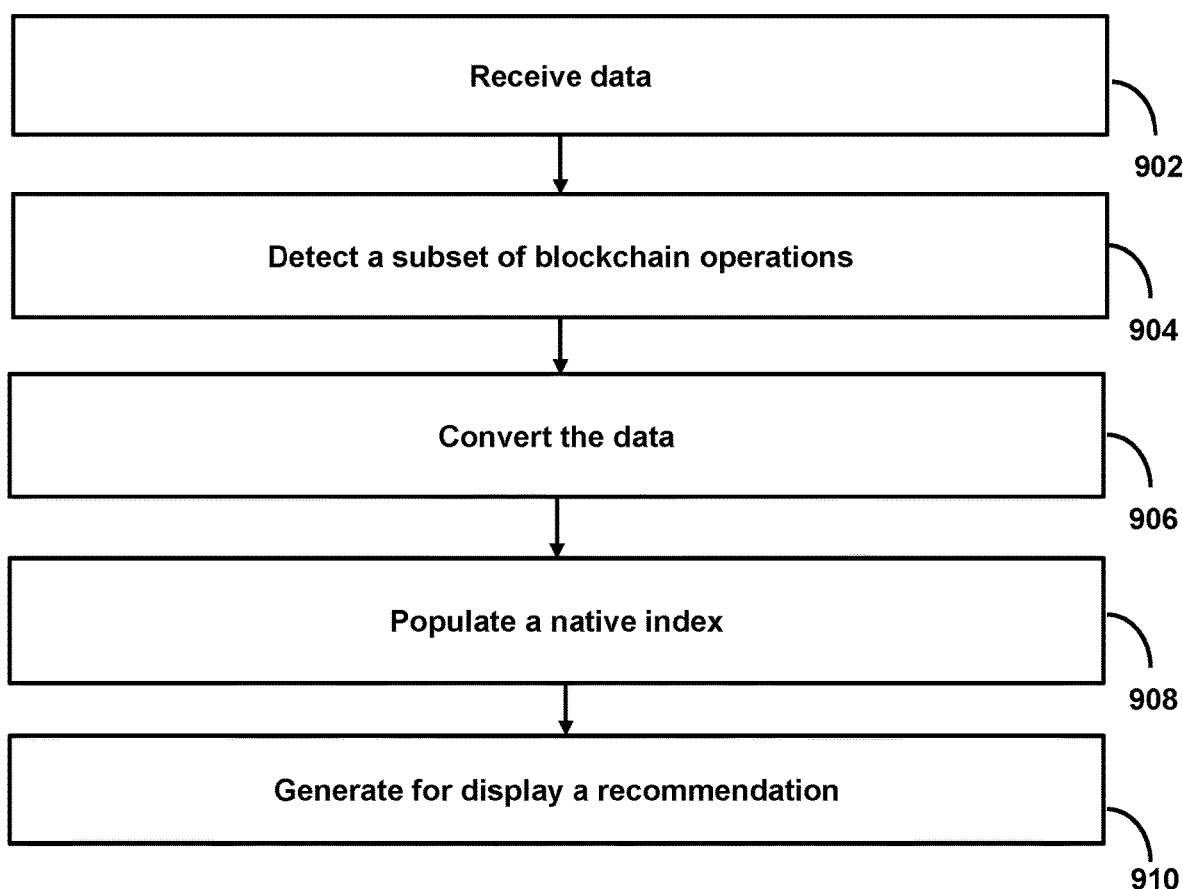
FIG. 9 shows a flowchart of steps involved for using secure, encrypted communications across distributed computer networks to efficiently index blockchain states for performing blockchain operations in decentralized applications using cryptography-based digital repositories, in accordance with one or more embodiments.

FIG. 9 shows a flowchart of steps involved for using secure, encrypted communications across distributed computer networks to efficiently index blockchain states for performing blockchain operations in decentralized applications using cryptography-based digital repositories. For example, the system may use process 900 (e.g., as implemented on one or more system components described above) in order to efficiently index blockchain states for performing blockchain operations.

For example, cryptography-based digital repositories or a cryptography-based, storage application may refer to a digital wallet. A digital wallet may comprise a software-based system that securely (and typically in an encrypted format) stores users, confidential information, personal information, payment information, and/or passwords. for numerous payment methods and websites. By using a digital wallet, users can complete communications, purchases, and/or other blockchain operations easily and securely without risking the information becoming public or subject to a cyber-attack.

At step 902, process 900 (e.g., using one or more components described above) may receive data. For example, the system may receive, at a cryptography-based, indexing application from a blockchain node, data in a first data format. For example, the data may correspond to a current state of a blockchain. For example, the first data format may be a native format for the blockchain. As another example, the blockchain node may verify batches of blockchain operations. For example, each batch of the batches may comprise a plurality of blockchain operations involving a first cryptography-based, storage application and a second cryptography-based, storage application.

In some embodiments, receiving the data may comprise determining to poll the blockchain. For example, the system may determine a historic rate at which the blockchain is updated. The system may then determine, based on the historic rate, whether to poll the blockchain for the data. For example, the system may periodically poll (e.g., using a poller application) the blockchain for new blocks. To do so, the system needs to connect to one node (or ideally multiple nodes for redundancy) to read blocks from the blockchain. To discover new blocks, the system may use a poller that periodically queries (e.g., based on a predetermined rate, a historic rate, and/or based on detection of a given number of blockchain operations) the blockchain node for new blocks. The system may manage the number of times (or the frequency at which) it polls a blockchain node in order to manage resource utilization related to the polling. Upon detecting a new block, the system may make a single batched JSON-RPC to the node requesting all blockchain operation receipts for that block (or a subset of the blockchain operations). These receipts may contain the information used to populate the native index.

At step 904, process 900 (e.g., using one or more components described above) may detect a subset of blockchain operations. For example, the system may detect, based on parsing the data, a subset of blockchain operations of a plurality of blockchain operations verified by a blockchain node. In some embodiments, a cryptography-based, index application may detect the subset of blockchain operations of the plurality of blockchain operations.

At step 906, process 900 (e.g., using one or more components described above) may convert the data. For example, the system may convert the data in the first data format to a second data format, wherein the second data format is native to the cryptography-based, indexing application. In some embodiments, the cryptography-based, indexing application may convert the data.

At step 908, process 900 (e.g., using one or more components described above) may populate a native index. For example, the system may populate a native index, for the cryptography-based, indexing application, with the data in the second data format. For example, the native index may comprise a queryable record of the subset of blockchain operations. In some embodiments, the cryptography-based, indexing application may populate the native index with the data in the second data format.

For example, when events (e.g., one or more blockchain operations) are detected, the system may generate recommendations (e.g., transmit notification of the event to downstream applications) prior to updating a native index. In such cases, the system may send events as soon as the system detects them and thus before saving them to the native index. However, this means that the system may send an event even if the writing of that event to a native index fails. This can lead to a client (e.g., a downstream device) generating a recommendation (e.g., an alert, transaction opportunity, and/ or other recommendation for a blockchain operation) based on the event. However, if the client then queries the native index for more information about the recommendation, the native index may return incomplete and/or inaccurate information. While in some embodiments the system may prioritize sending events as they happen so that clients have real-time information about the state of the blockchain, this option also means the system may send the same event twice, if the polling or the index save process fails and restarts.

In some embodiments, converting the data in the first data format to the second data format may comprise storing metadata in the native index. For example, the system may generate metadata in the second data format, wherein the metadata indicates a blockchain standard corresponding to a token. The system may then store the metadata in the native index as an additional data field in a columnar database.

For example, the system may store blocks that contain metadata, links to prior blocks, and blockchain operation receipts. The metadata and prior block hash may be stored by the system in a blocks table. Each blockchain operation may be stored in an operations table as a single row, with a foreign key link to the blocks table. This transaction row may contain a 'data' field, potentially containing redundant information overlapping with an indexed_transactions table (e.g., for an internal state). The system may parse the blockchain operation and blockchain operation receipt logs (specifically the data field) to determine whether specific standards (e.g., tokens such as ERC20 or ERC721) were subject to a blockchain operation. The system may record each transfer event by writing to a unique row in the indexed_transactions table. In some embodiments, the system may further convert the index to a columnar database. For example, a columnar database is a column-oriented storage for database. The system may use this orientation in order to improve the speed of data retrieval of data columns, for example for analytical applications. The use of the columnar format (as opposed to a row-based format) significantly reduces the overall disk I/O requirements and limits the amount of data the system needs to load.

In some embodiments, data may be populated to the native index based on user assets. For example, the system may determine that a user account comprises assets related to the subset of blockchain operations. The system may then in response to determining that the user account comprises the assets the subset of blockchain operations, select a filtering parameter corresponding to the subset of blockchain operations.

The system may use various criteria for selecting data with which to populate the native index. For example, the system may select a specific subset of blockchain operations to record based on whether or not user accounts have assets of that type. In another example, the system may select a specific subset of blockchain operations to record based on whether or not a given share of user accounts have assets of that type. In another example, the system may select a specific subset of blockchain operations to record based on whether or not a given number of blockchain operations (e.g., for a given time period) have assets of that type.

At step 910, process 900 (e.g., using one or more components described above) may generate for display a recommendation. For example, the system may in response to populating the native index with the data in the second data format, generate for display, in a user interface, a recommendation based on the data. In some embodiments, the cryptography-based, indexing application may generate for display, the recommendation based on the data. For example, the system may delay publishing information to downstream client and/or generating recommendations based on detected blockchain operations until the blockchain operation has been recorded in the native index.

In some embodiments, additional information about a blockchain operation may be retrieved. For example, the system may receive a first user request for first information corresponding to the recommendation. The system may then retrieve the first information from the native index. For example, the system may use information from the native index to provide additional information about a given blockchain operation. Furthermore, the native index may provide a queryable resource that supports numerous searching formats (e.g., Boolean search operators) that are not available when querying a blockchain node and/or not feasible due to the first data format.

In some embodiments, generating for display, in the user interface, the recommendation based on the data may comprise whether an index save process is complete. For example, the system may determine determining whether an index save process is complete for populating the native index with the data in the second data format. The system may then in response to determining whether the index save process is complete, generate a completion confirmation. The system may then determine the recommendation after generating the completion confirmation.

For example, the system may ensure that the native index is updated and/or accurate prior to generating one or more recommendations based on the information. By determining recommendations after confirming that relevant information has been written to the native index, the system is able to guarantee that response to client requests for access to the event information are accurate. Furthermore, the introduction of delays (e.g., from the instance that a new block appears) to the indexing of information provides reliability that subsequent blockchain operations are not being written to incorrect forks in the blockchain.

In some embodiments, second information may be retrieved from the native index. For example, the system may receive a second user request for second information related to a first blockchain operation. The system may then determine that the first blockchain operation is of a first operation type of a plurality of operation types. The system may then, in response to determining that the first blockchain operation is of the first operation type, retrieve the second information from the native index.

For example, the system may pull information from the cryptography-based, indexing application if the blockchain operation is of a given type and/or has a given characteristic. That is, the system may gather raw data from an internal index instead of a blockchain node if the blockchain operation is of a given type and/or has a given characteristic. Accordingly, the system may improve efficiency by only relying on querying a blockchain node for specific blockchain operations. For example, the system may query a blockchain node to pull information about, and/or perform, a first blockchain operation (e.g., a call operation). The system may rely on the blockchain node to pull information of this type at it is computationally simple and requires no gas. In another example, the system may rely on an internal index to pull information about, and/or perform, a second blockchain operation (e.g., a transfer operation). For example, an internal index may remain a predetermined number of blocks behind a chain tip (e.g., 1-5, 1-10, over 10, etc.) in order to ensure subsequent blockchain operations are written to a correct fork (if multiple forks are present).

In some embodiments, first information may be retrieved from the native index. For example, the system may receive a third user request for second information related to a first blockchain operation. The system may then determine that the second information is of a first information type of a plurality of information types. The system may then, in response to determining that the second information is of the first information type, retrieve the first information from the native index.

For example, the system may pull information from the cryptography-based, indexing application if the information is of a given type and/or has a given characteristic. That is, the system may gather raw data from an internal index instead of a blockchain node if the information is of a given type and/or has a given characteristic. Accordingly, the system may improve efficiency by only relying on querying a blockchain node for specific information. For example, the system may query a blockchain node to pull information about specific contract addresses (e.g., when detecting whether a blockchain operation is using a first standard such as ERC20 as opposed to a second standard such as ERC721). The system may rely on the blockchain node to pull information of this type as it is computationally simple and/or requires no gas. In another example, the system may rely on an internal index to determine whether or not a new block has been added to the blockchain. For example, an internal index may remain a predetermined number of blocks behind a chain tip (e.g., 1-5, 1-10, over 10, etc.) in order to ensure subsequent blockchain operations are written to a correct fork (if multiple forks are present) and/or only verified information on a correct fork is reported.

In some embodiments, a new blockchain operation request may be received. For example, the system may receive a fourth user request to perform a new blockchain operation based on the recommendation. The system may then, in response to the fourth user request, access a first cryptography-based, storage application. For example, the first cryptography-based, storage application may correspond to a first private key, and the first private key may be stored on a user device.

For example, the first cryptography-based, storage application may be a non-custodial cryptography-based, storage application. That is, the first cryptography-based, storage application may be a separate, standalone application that allows users to store, or maintain custody of, their own crypto, and explore the decentralized web with a decentralized application browser. The first cryptography-based, storage application may be a standalone application that does not require interaction with a user account (e.g., an account from a blockchain services provider, centralized brokerage, and/or exchange). The first cryptography-based, storage application may allow users to manage their own private keys and store their crypto assets directly on their devices, not with a centralized brokerage or exchange.

In some embodiments, a user selection of the recommendation may cause execution of a new blockchain operation. For example, the system may receive a user selection of the recommendation which may cause an execution of a new blockchain operation using a second cryptography-based, storage application, wherein the second cryptography-based, storage application corresponds to a first partial private key and a second partial private key, wherein the first partial private key is stored on a remote device network, and wherein the second partial private key is stored on a user device.

For example, the second cryptography-based, storage application may be a custodial or semi-custodial cryptography-based, storage application. That is, the second cryptography-based, storage application may be a separate, standalone application that allows users to store, or maintain custody of, their own crypto, and explore the decentralized web with a decentralized application browser through an application provided by a blockchain services provider, centralized brokerage, and/or exchange. The second cryptography-based, storage application may be an application that requires interaction with a user account from a blockchain services provider, centralized brokerage, and/or exchange. The second cryptography-based, storage application may allow users to have their private keys managed by the blockchain services provider, centralized brokerage, and/or exchange without storing their own private keys (at least completely) and crypto assets directly on their devices.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

Figure 10:
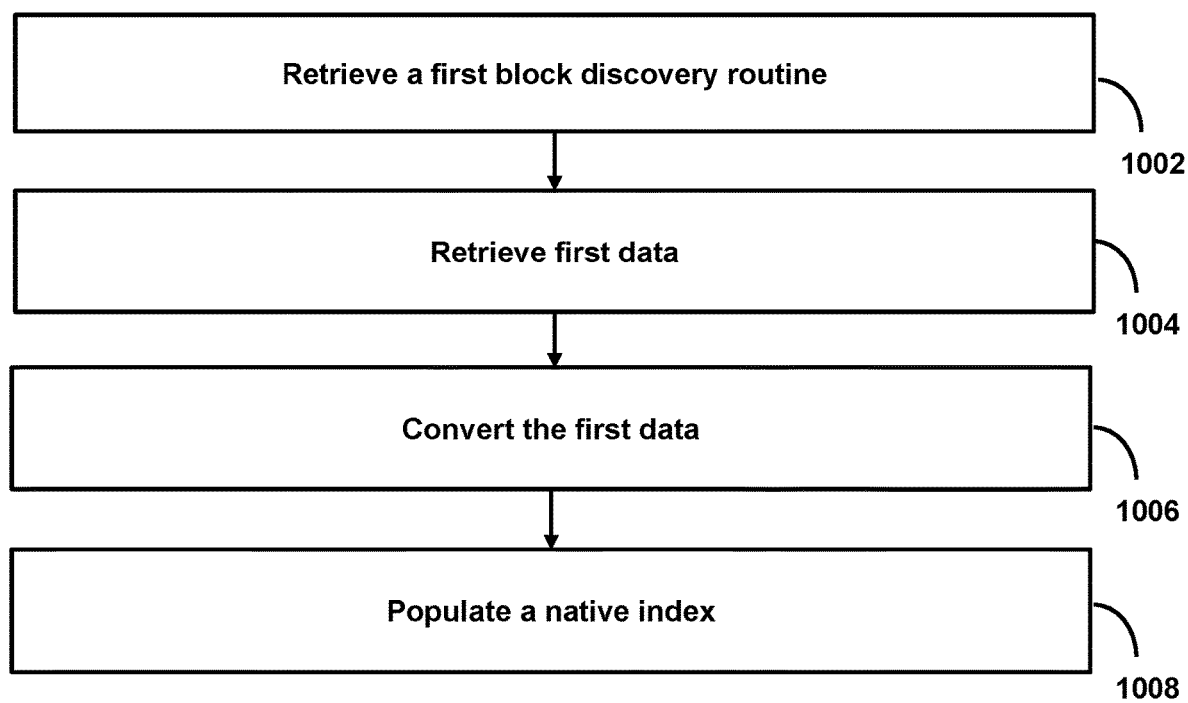
FIG. 10 shows a flowchart of steps involved for using secure, encrypted communications across distributed computer networks to provide variable resiliency when indexing blockchain states for performing blockchain operations in decentralized applications using cryptography-based digital repositories, in accordance with one or more embodiments.

FIG. 10 shows a flowchart of steps involved for using secure, encrypted communications across distributed computer networks to provide variable resiliency when indexing blockchain states for performing blockchain operations in decentralized applications using cryptography-based digital repositories. For example, the system may use process 1000 (e.g., as implemented on one or more system components described above) in order to provide variable resiliency when indexing blockchain states for performing blockchain operations.

For example, cryptography-based digital repositories or a cryptography-based, storage application may refer to a digital wallet. A digital wallet may comprise a software-based system that securely (and typically in an encrypted format) stores users, confidential information, personal information, payment information, and/or passwords. for numerous payment methods and websites. By using a digital wallet, users can complete communications, purchases, and/or other blockchain operations easily and securely without risking the information becoming public or subject to a cyber-attack.

For example, in some embodiments, the system may comprise a first cryptography-based, storage application. The first cryptography-based, storage application may correspond to a first private key, and the first private key may be stored on a user device. For example, the first cryptography-based, storage application may be a non-custodial cryptography-based, storage application. That is, the first cryptography-based, storage application may be a separate, standalone application that allows users to store, or maintain custody of, their own crypto, and explore the decentralized web with a decentralized application browser. The first cryptography-based, storage application may be a standalone application that does not require interaction with a user account (e.g., an account from a blockchain services provider, centralized brokerage, and/or exchange). The first cryptography-based, storage application may allow users to manage their own private keys and store their crypto assets directly on their devices, not with a centralized brokerage or exchange.

As another example, in some embodiments, the system may comprise a second cryptography-based, storage application. For example, the second cryptography-based, storage application may correspond to a first partial private key and a second partial private key. For example, the first partial private key may be stored on a remote device network, and the second partial private key may be stored on the user device. For example, the second cryptography-based, storage application may be a custodial or semi-custodial cryptography-based, storage application. That is, the second cryptography-based, storage application may be a separate, standalone application that allows users to store, or maintain custody of, their own crypto, and explore the decentralized web with a decentralized application browser through an application provided by a blockchain services provider, centralized brokerage, and/or exchange. The second cryptography-based, storage application may be an application that requires interaction with a user account from a blockchain services provider, centralized brokerage, and/or exchange. The second cryptography-based, storage application may allow users to have their private keys managed by the blockchain services provider, centralized brokerage, and/or exchange without storing their own private keys (at least completely) and crypto assets directly on their devices.

In yet another example, the system may comprise a blockchain node. For example, the blockchain node may verify batches of blockchain operations. For example, each batch of the batches may comprise a plurality of blockchain operations involving the first cryptography-based, storage application and the second cryptography-based, storage application.

At step 1002, process 1000 (e.g., using one or more components described above) may retrieve a first block discovery routine. For example, the system may retrieve, at a cryptography-based, indexing application from a blockchain node, a first block discovery routine of a plurality of block discovery routines. For example, the first block discovery routine may indicate a first number of blocks of a blockchain to retrieve from a blockchain node.

For example, the plurality of block discovery routines may each correspond to a different number of blocks of the blockchain that are retrieved at a given time. Additionally or alternatively, a block discovery routine may indicate other characteristics of a block discovery process. For example, a given routine may indicate whether or not data for a retrieved number of blocks is converted and/or populated in a native index in series or concurrently. For example, in some situations, the system may need to populate the native index up to the chain tip as quickly as possible. Accordingly, the system may use different logic in the different circumstance. While a block listener (e.g., a component that detects new blocks) may have no need to poll or wait for new blocks when the database is not behind the chain tip, the system may need to quickly populate the native index if the native index falls too far behind the chain tip. In such cases, the system may begin a backfill using specialized logic. For example, the system may launch batches of N (e.g., 10-50) block discovery routines (e.g., "goroutines") at a time that fetch blocks K to K+N from the blockchain node and/or save the blocks to the native index concurrently. By doing so, the system may increase the speed at which the native index is updated while ensuring minimal, if any, retry logic.

In some embodiments, the first block discovery routine may be selected. For example, the system may determine a historic rate at which the blockchain is updated. The system may then select, based on the historic rate, the first block discovery routine from the plurality of block discovery routines.

For example, the system may periodically poll (e.g., using a poller application) the blockchain for new blocks according to a given block discovery routine. To do so, the system needs to connect to one node (or ideally multiple nodes for redundancy) to read blocks from the blockchain. The particular block discovery routine selected may be based on one or more characteristic (e.g., based on a predetermined rate, a historic rate, and/or based on detection of a given number of blockchain operations). Accordingly, the system may manage the number of times (or the frequency at which) it polls a blockchain node in order to manage resource utilization related to the polling and/or manage the speed at which the native index is updated. Upon selection of a new block discovery routine, the system may make a single batched JSON-RPC to the node requesting all blockchain operation receipts for the block (or a subset of the blocks). These receipts may contain the information used to populate the native index.

In some embodiments, the first block discovery routine may be selected based on a retention time. For example, the system may determine an internal state of the native index. For example, the internal state of the native index may comprise an independent ledger for the blockchain that is specific to the cryptography-based, indexing application and the blockchain. The system may then determine a retention time for the internal state. The system may then compare the retention time to a threshold retention time. The system may then select the first block discovery routine in response to the retention time being below the threshold retention time.

For example, the system may log each new discovered block, each blockchain operation, each blockchain-specific transfer event, etc. independently or in batches based on the block discovery routine. The system may then allow downstream application to query the index as opposed to the blockchain node. The system may then allow applications to subscribe to the index, as opposed to manually calling a blockchain node upon each request. By subscribing to the index, applications like cryptography-based, storage application can update their internal state to reflect the current state of a blockchain in real time without needing to poll a blockchain node. This eliminates wasted computation cycles on polling when no new data has arrived. As such, the system may need to ensure that the internal state is updated and therefore compare it to a given retention time.

In some embodiments, the first block discovery routine may be selected based on assets. For example, the system may determine that a user account comprises assets related to a new block. The system may then in response to determining that the user account comprises the assets related to the new block, selecting the first block discovery routine. For example, the system may select a given block discovery routine based on the needs (or likely needs) of a user and/or downstream device. As such, the system may determine whether or not blockchain operations in a block (or likely to be in a block) are relevant to an asset of the user. This may include periodic call requests for current states of a blockchain and/or standards of blockchain operations being recorded in the blockchain.

At step 1004, process 1000 (e.g., using one or more components described above) may retrieve first data. For example, the system may retrieve, at the cryptography-based, indexing application from the blockchain node, first data. For example, the first data may correspond to the first number of blocks of the blockchain, and the first data may be in a first data format that is a native format for the blockchain.

At step 1006, process 1000 (e.g., using one or more components described above) may convert the first data. For example, the system may convert the first data in the first data format to a second data format, wherein the second data format is native to the cryptography-based, indexing application. In some embodiments, the cryptography-based, indexing application may convert the first data in the first data format to the second data format.

In some embodiments, converting the first data in the first data format to the second data format may comprise generating metadata. For example, the system may generate metadata in the second data format, wherein the metadata indicates a blockchain standard corresponding to a token. The system may then store the metadata in the native index as an additional data field in a columnar database.

For example, the system may store blocks that contain metadata, links to prior blocks, and blockchain operation receipts. The metadata and prior block hash may be stored by the system in a blocks table. Each blockchain operation may be stored in an operations table as a single row, with a foreign key link to the blocks table. This transaction row may contain a data field, potentially containing redundant information overlapping with an indexed_transactions table (e.g., for an internal state). The system may parse the blockchain operation and blockchain operation receipt logs (specifically the data field) to determine whether specific standards (e.g., tokens such as ERC20 or ERC721) were subject to a blockchain operation. The system may record each transfer event by writing to a unique row in the indexed_transactions table. In some embodiments, the system may further convert the index to a columnar database. For example, a columnar database is a column-oriented storage for database. The system may use this orientation in order to improve the speed of data retrieval of data columns, for example for analytical applications. The use of the columnar format (as opposed to a row-based format) significantly reduces the overall disk I/O requirements and limits the amount of data the system needs to load.

At step 1008, process 1000 (e.g., using one or more components described above) may populate a native index. For example, the system may populate a native index, for the cryptography-based, indexing application, with the first data in the second data format. For example, the native index may comprise a queryable record of a subset of blockchain operations of the blockchain. In some embodiments, the cryptography-based, indexing application may populate the native index with the first data in the second data format.

In some embodiments, first information may be retrieved from the native index. For example, the system may, in response to populating the native index with the first data in the second data format, generate for display, in a user interface, a recommendation based on the first data. The system may then receive a first user request for first information corresponding to the recommendation. The system may then retrieve the first information from the native index.

For example, the system may use information from the native index to provide additional information about a given blockchain operation. Furthermore, the native index may provide a queryable resource that supports numerous searching formats (e.g., Boolean search operators) that are not available when querying.

In some embodiments, retrieving the first information from the native index may comprise determining whether an index save process is complete. For example, the system may determine whether an index save process is complete for populating the native index with the first data in the second data format. The system may then, in response to determining whether the index save process is complete, generate a completion confirmation. The system may then select to retrieve the first information from the native index based on the completion confirmation.

For example, the system may ensure that the native index is updated and/or accurate prior to generating one or more recommendations based on the information. By determining recommendations after confirming that relevant information has been written to the native index, the system is able to guarantee that response to client requests for access to the event.

In some embodiments, respective data from the first number of blocks is populated in the native index concurrently. For example, the system may update recently received data concurrently, serial, and/or based on a given need. For example, in some embodiments, the system may need to quickly update a native database through concurrent updating. In other embodiments, the system may prioritize a given block of data (or data from a given block) based on current needs.

In some embodiments, a second block discovery routine may be retrieved. For example, the system may retrieve a second block discovery routine of the plurality of block discovery routines. For example, the second block discovery routine may indicate a second number of blocks of the blockchain to retrieve from the blockchain node. The system may then retrieve second data. For example, the second data may correspond to the second number of blocks of the blockchain, and the second data may be in the first data format. The system may then convert the second data in the first data format to the second data format. The system may then populate the native index with the second data in the second data format.

In some embodiments, a third block discovery routine may be retrieved. For example, the system may retrieve a third block discovery routine of the plurality of block discovery routines. For example, the third block discovery routine may parse the native index to detect missing data. The system may then retrieve the missing data based on the third block discovery routine. The system may then convert the missing data in the first data format to the second data format. The system may then populate the native index with the missing data in the second data format.

For example, the plurality of block discovery routines may each indicate specific characteristics of a block discovery process that may be beneficial in a given scenario. For example, the system may have a background process that periodically scans the native index (e.g., a table corresponding to the native index) for missing blocks (e.g., holes in the monotonically increasing series of numbers). The system may then fetch those missing blocks from the blockchain node, with retry logic.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 10.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method, the method comprising: receiving, at a cryptography-based, indexing application, a first request to generate a queryable record of a subset of blockchain operations of a plurality of blockchain operations verified by a blockchain node, wherein the first request comprises a first criterion and a second criterion for designating the subset, wherein the first criterion corresponds to a non-fungible token standard, and wherein the second criterion corresponds to a fungible token standard, and wherein the plurality of blockchain operations comprises events recorded in a first data format that is specific to a first blockchain; in response to receiving the first request, searching the plurality of blockchain operations verified by the blockchain node based on the first criterion and the second criterion; receiving, from the blockchain node, data in the first data format corresponding to the first criterion and the second criterion; converting the data in the first data format to a second data format, wherein the second data format comprises the queryable record of the subset of blockchain operations, wherein the second data format comprises first metadata, wherein the first metadata distinguishes between the non-fungible token standard and the non-fungible token standard; receiving, at the cryptography-based, indexing application, a second request to search the queryable record of the subset of blockchain operations, wherein the second request comprises a user request for the non-fungible token standard; and in response to the second request, generating for display, on a user interface, a search result based on the second request, wherein each search result is linked to a respective record in the cryptography-based, indexing application.

A2. The method of embodiment A1, wherein searching the plurality of blockchain operations verified by the blockchain node based on the first criterion and the second criterion further comprises: generating a first call to the blockchain node, wherein the first call comprises a filtering parameter based on the first criterion and the second criterion; and in response to the first call, receiving a first response from the blockchain node, wherein the first response comprises the data, corresponding to the filtering parameter, in the first data format.

A3. The method of any of embodiments A1-A2, wherein searching the plurality of blockchain operations verified by the blockchain node based on the first criterion and the second criterion further comprises: retrieving a set of function selectors defined by an application binary interface for the blockchain; determining a keyword corresponding to the non-fungible token standard based on the set of function selectors; and generating the first criterion based on the keyword.

A4. The method of any of embodiments A1-A3, wherein retrieving the set of function selectors defined by the application binary interface for the blockchain further comprises: transmitting a call to a destination address with a first predetermined input; and determining the set of function selectors based on the response to the call.

A5. The method of any of embodiments A1-A4, wherein searching the plurality of blockchain operations verified by the blockchain node based on the first criterion and the second criterion further comprises: retrieving a blockchain component for the blockchain, wherein the blockchain component is specific to the non-fungible token; generating the first criterion based on the blockchain component.

A6. The method of any of embodiments A1-A5, wherein searching the plurality of blockchain operations verified by the blockchain node based on the first criterion and the second criterion further comprises: determining a blockchain component for the blockchain, wherein the blockchain component is specific to the fungible token; generating the second criterion based on the blockchain component.

A7. The method of any of embodiments A1-A6, wherein determining the blockchain component comprises: determining whether the blockchain component provides division of a token; and in response to determining that the blockchain component provides division of the token, selecting the blockchain component as specific to the fungible token.

A8. The method of any of embodiments A1-A7, wherein generating the search result based on the second request further comprises: retrieving the respective record, at the cryptography-based, indexing application, for the search result; comparing the respective record to an internal state of the cryptography-based, indexing application for the respective record, wherein the internal state of the cryptography-based, indexing application comprises an independent ledger for the blockchain that is specific to the cryptography-based, indexing application; and modifying the search result based on the internal state.

A9. The method of any of embodiments A1-A8, wherein comparing the respective record to the internal state of the cryptography-based, indexing application for the respective record further comprises: determining a retention time for the internal state; comparing the retention time to a threshold retention time; and determining whether to modify the search result based on the internal state in response to the retention time being below the threshold retention time.

A10. The method of any of embodiments A1-A9, further comprising: determining that a user account comprises assets in the non-fungible token standard; and in response to determining that the user account comprises the assets in the non-fungible token standard, selecting the first criterion.

A11. The method of any of embodiments A1-A10, further comprising: determining a share of user accounts that comprise assets in the non-fungible token standard; comparing the share to a threshold share; and in response determining that the share corresponds to the threshold share, selecting the first criterion.

A12. The method of any of embodiments A1-A11, further comprising: determining a number of blockchain operations for a user account that comprise assets in the non-fungible token standard; comparing the number to a threshold number; and in response determining that the number corresponds to the threshold number, selecting the first criterion.

A13. The method of any of embodiments A1-A12, further comprising: generating the first metadata in the second data format, wherein the first metadata indicates a blockchain standard corresponding to a token; and storing the first metadata at the cryptography-based, indexing application as an additional data field in a columnar database.

B1. A method, the method comprising: receiving, at a cryptography-based, indexing application, a first request to generate a queryable record of a subset of blockchain operations of a plurality of blockchain operations verified by a blockchain node; receiving, from the blockchain node, data in a first data format corresponding to verified blockchain operations for a blockchain; comparing a verified blockchain operation of the verified blockchain operations to a plurality of criteria to determine a respective ranking for the verified blockchain operation; comparing the respective ranking to a threshold ranking; in response to determining that the respective ranking corresponds to the threshold ranking, selecting the verified blockchain operation for the subset of blockchain operations; converting a portion of the data corresponding to the verified blockchain operation from the first data format to a second data format, wherein the second data format comprises the queryable record of the subset of blockchain operations; receiving, at the cryptography-based, indexing application, a second request to search the queryable record of the subset of blockchain operations; and in response to the second request, generating for display, on a user interface, a search result based on the second request.

B2. The method of embodiment B1, further comprising: determining a rate at which new blocks are being added to the blockchain; and determining the threshold ranking based on the rate.

B3. The method of any of embodiments B1-B2, further comprising: further comprising: determining a rate at which new blocks are being added to the blockchain; and determining a number of criteria in the plurality of criteria based on the rate.

B4. The method of any of embodiments B1-B3, wherein comparing the verified blockchain operation of the verified blockchain operations to the plurality of criteria to determine the respective ranking for the verified blockchain operation further comprises: generating a first call to the blockchain node, wherein the first call comprises a filtering parameter for the verified blockchain operation; and in response to the first call, receiving a first response from the blockchain node, wherein the first response comprises the data, corresponding to the filtering parameter, in the first data format.

B5. The method of any of embodiments B1-B4, wherein comparing the verified blockchain operation of the verified blockchain operations to the plurality of criteria to determine the respective ranking for the verified blockchain operation further comprises: retrieving a set of function selectors defined by an application binary interface for the blockchain; determining a keyword based on the set of function selectors; and determining whether the verified blockchain operation comprises the keyword.

B6. The method of any of embodiments B1-B5, wherein comparing the verified blockchain operation of the verified blockchain operations to the plurality of criteria to determine the respective ranking for the verified blockchain operation further comprises: retrieving a blockchain component for the blockchain, wherein the blockchain component is specific to a given standard; determining whether the verified blockchain operation comprises the blockchain component.

B7. The method of any of embodiments B1-B6, wherein comparing the verified blockchain operation of the verified blockchain operations to the plurality of criteria to determine the respective ranking for the verified blockchain operation further comprises: determining a blockchain component that enable division of a token; and determining whether the verified blockchain operation comprises the blockchain component.

B8. The method of any of embodiments B1-B7, further comprising: determining that a user account comprises assets in a first standard; and in response to determining that the user account comprises the assets in the first standard, selecting a first criterion of the plurality of criteria that corresponds to the first standard.

B9. The method of any of embodiments B1-B8, further comprising: determining a share of user accounts that comprise assets of a first standard; comparing the share to a threshold share; and in response determining that the share corresponds to the threshold share, selecting a first criterion of the plurality of criteria that corresponds to the first standard.

B10. The method of any of embodiments B1-B9, further comprising: determining a number of blockchain operations for a user account that comprise assets in of a first standard; comparing the number of blockchain operations to a threshold number; and in response determining that the number of blockchain operations corresponds to the threshold number, selecting a first criterion of the plurality of criteria that corresponds to the first standard.

C1. A method, the method comprising: receiving, at a cryptography-based, indexing application, a first request to query a first subset of blockchain operations of a plurality of blockchain operations verified by a blockchain node; in response to the first request, generating, for each of the first subset of blockchain operations, a respective call operation for querying the blockchain node; determining, for each of the first subset of blockchain operations, a respective network-imposed processing load for the respective call operation, wherein the respective network-imposed processing load for each of the first subset of blockchain operations corresponds to a respective computational effort required to execute the respective call operation; generating an aggregate call operation, wherein the aggregate call operation causes execution of the respective call operation for each of the first subset of blockchain operations; determining an aggregate network-imposed processing load for the aggregate call operation, wherein the aggregate network-imposed processing load corresponds to an aggregation of the respective network-imposed processing load for each of the first subset of blockchain operations; determining whether the aggregate network-imposed processing load is available; and in response to determining that the aggregate network-imposed processing load is available, executing the aggregate call operation.

C2. The method of embodiment C1, further comprising: receiving, at a cryptography-based, indexing application, a second request to query a second subset of blockchain operations of a plurality of blockchain operations verified by a blockchain node; in response to the second request, generating, for each of the second subset of blockchain operations, a respective additional operation, wherein the respective additional operation comprises a write operation; determining, for each of the second subset of blockchain operations, a respective additional network-imposed processing load for the respective additional operation, wherein the respective additional network-imposed processing load for each of the second subset of blockchain operations corresponds to a respective additional computational effort required to execute the respective additional operation; generating an additional aggregate operation, wherein the additional aggregate operation causes execution of the respective additional operation for each of the second subset of blockchain operations; determining an additional aggregate network-imposed processing load for the additional aggregate operation, wherein the additional aggregate network-imposed processing load corresponds to an additional aggregation of the respective additional network-imposed processing load for each of the second subset of blockchain operations; determining whether the additional aggregate network-imposed processing load is available; and in response to determining that the additional aggregate network-imposed processing load is available, executing the additional aggregate operation.

C3. The method of any of embodiments C1-C2, wherein determining the additional aggregate network-imposed processing load comprises: generating a simulation of each of the second subset of blockchain operations; and determining network-imposed processing loads for the simulation of each of the second subset of blockchain operations.

C4. The method of any of embodiments C1-C3, wherein generating the simulation further comprises: determining that the blockchain node remains synced at a time of simulation; and determining a pending transaction propagating through a mempool.

C5. The method of any of embodiments C1-C4, wherein generating the simulation further comprises: predicting blockchain operations that are likely to be included in a next block; and in response to determining that the first subset of blockchain operations are likely to be included in the next block, simulating the first subset of blockchain operations against a current block state.

C6. The method of any of embodiments C1-C5, wherein determining whether the aggregate network-imposed processing load is available further comprises: determining an amount of fungible tokens specific to the blockchain corresponding to the aggregate network-imposed processing load; accessing a first cryptography-based, storage application, wherein the first cryptography-based, storage application corresponds to a first private key, and wherein the first private key is stored on a user device; determining whether the first cryptography-based, storage application comprises the amount of fungible tokens specific to the blockchain; and in response to determining that the first cryptography-based, storage application comprises the amount of fungible tokens specific to the blockchain, determining to execute the aggregate call operation.

C7. The method of any of embodiments C1-C6, wherein determining whether the aggregate network-imposed processing load is available further comprises: determining an amount of fungible tokens specific to the blockchain corresponding to the aggregate network-imposed processing load; accessing a second cryptography-based, storage application, wherein the second cryptography-based, storage application corresponds to a first partial private key and a second partial private key, wherein the first partial private key is stored on a remote device network, and wherein the second partial private key is stored on a user device; determining whether the second cryptography-based, storage application comprises the amount of fungible tokens specific to the blockchain; and in response to determining that the second cryptography-based, storage application comprises the amount of fungible tokens specific to the blockchain, determining to execute the aggregate call operation.

C8. The method of any of embodiments C1-C7, wherein generating an aggregate call operation further comprises: determining a first standard for a first blockchain operation of the first subset of blockchain operations; and formatting a first respective call operation based on the first standard, wherein the first respective call operation corresponds to the first blockchain operation.

C9. The method of any of embodiments C1-C8, wherein generating, for each of the first subset of blockchain operations, a respective call operation for querying the blockchain node further comprises: determining a respective filtering parameter for each of the first subset of blockchain operations; and generating the respective filtering parameter in a first data format, wherein the first data format is specific to the blockchain.

C10. The method of any of embodiments C1-C9, further comprising: determining that a user account comprises assets corresponding to the first subset of blockchain operations; and determining to query the first subset of blockchain operations based on determining that the user account comprises assets corresponding to the first subset of blockchain operations.

D1. A method, the method comprising: receiving, at a cryptography-based, indexing application from a blockchain node, data, in a first data format, corresponding to a current state of a blockchain, wherein the first data format is a native format for the blockchain; detecting, based on parsing the data, a subset of blockchain operations of a plurality of blockchain operations verified by a blockchain node; converting the data in the first data format to a second data format, wherein the second data format is native to the cryptography-based, indexing application; populating a native index, for the cryptography-based, indexing application, with the data in the second data format, wherein the native index comprises a queryable record of the subset of blockchain operations; and in response to populating the native index with the data in the second data format, generating for display, in a user interface, a recommendation based on the data.

D2. The method of embodiment D1, further comprising: receiving a first user request for first information corresponding to the recommendation; and retrieving the first information from the native index.

D3. The method of any of embodiments D1-D2, wherein generating for display, in the user interface, the recommendation based on the data further comprises: determining whether an index save process is complete for populating the native index with the data in the second data format; in response to determining whether the index save process is complete, generating a completion confirmation; and determining the recommendation after generating the completion confirmation.

D4. The method of any of embodiments D1-D3, further comprising: receiving a second user request for second information related to a first blockchain operation; determining that the first blockchain operation is of a first operation type of a plurality of operation types; and in response to determining that the first blockchain operation is of the first operation type, retrieving the second information from the native index.

D5. The method of any of embodiments D1-D4, further comprising: receiving a third user request for second information related to a first blockchain operation; determining that the second information is of a first information type of a plurality of information types; and in response to determining that the second information is of the first information type, retrieving the first information from the native index.

D6. The method of any of embodiments D1-D5, further comprising: receiving a fourth user request to perform a new blockchain operation based on the recommendation; and in response to the fourth user request, accessing a first cryptography-based, storage application, wherein the first cryptography-based, storage application corresponds to a first private key, and wherein the first private key is stored on a user device.

D7. The method of any of embodiments D1-D6, wherein a user selection of the recommendation causes an execution of a new blockchain operation using a second cryptography-based, storage application, wherein the second cryptography-based, storage application corresponds to a first partial private key and a second partial private key, wherein the first partial private key is stored on a remote device network, and wherein the second partial private key is stored on a user device.

D8. The method of any of embodiments D1-D7, wherein receiving the data further comprises: determining a historic rate at which the blockchain is updated; and determining, based on the historic rate, whether to poll the blockchain for the data.

D9. The method of any of embodiments D1-D8, further comprising: determining that a user account comprises assets related to the subset of blockchain operations; and in response to determining that the user account comprises the assets the subset of blockchain operations, selecting a filtering parameter corresponding to the subset of blockchain operations.

D10. The method of any of embodiments D1-D9, wherein converting the data in the first data format to the second data format further comprises: generating metadata in the second data format, wherein the metadata indicates a blockchain standard corresponding to a token; and storing the metadata in the native index as an additional data field in a columnar database.

E1. A method, the method comprising: retrieving, at a cryptography-based, indexing application from a blockchain node, a first block discovery routine of a plurality of block discovery routines, wherein the first block discovery routine indicates a first number of blocks of a blockchain to retrieve from a blockchain node; retrieving, at the cryptography-based, indexing application from the blockchain node, first data, wherein the first data corresponds to the first number of blocks of the blockchain, and wherein the first data is in a first data format that is a native format for the blockchain; converting the first data in the first data format to a second data format, wherein the second data format is native to the cryptography-based, indexing application; and populating a native index, for the cryptography-based, indexing application, with the first data in the second data format, wherein the native index comprises a queryable record of a subset of blockchain operations of the blockchain.

E2. The method of embodiment E1, further comprising: retrieving a second block discovery routine of the plurality of block discovery routines, wherein the second block discovery routine indicates a second number of blocks of the blockchain to retrieve from the blockchain node; retrieving second data, wherein the second data corresponds to the second number of blocks of the blockchain, and wherein the second data is in the first data format; converting the second data in the first data format to the second data format; and populating the native index with the second data in the second data format.

E3. The method of any of embodiments E1-E2, further comprising: in response to populating the native index with the first data in the second data format, generating for display, in a user interface, a recommendation based on the first data; receiving a first user request for first information corresponding to the recommendation; and retrieving the first information from the native index.

E4. The method of any of embodiments E1-E3, wherein retrieving the first information from the native index further comprises: determining whether an index save process is complete for populating the native index with the first data in the second data format; in response to determining whether the index save process is complete, generating a completion confirmation; and selecting to retrieve the first information from the native index based on the completion confirmation.

E5. The method of any of embodiments E1-E4, wherein respective data from the first number of blocks is populated in the native index concurrently.

E6. The method of any of embodiments E1-E5, further comprising: retrieving a third block discovery routine of the plurality of block discovery routines, wherein the third block discovery routine parses the native index to detect missing data; retrieving the missing data based on the third block discovery routine; converting the missing data in the first data format to the second data format; and populating the native index with the missing data in the second data format.

E7. The method of any of embodiments E1-E6, further comprising: determining a historic rate at which the blockchain is updated; and selecting, based on the historic rate, the first block discovery routine from the plurality of block discovery routines.

E8. The method of any of embodiments E1-E7, further comprising: determining an internal state of the native index, wherein the internal state of the native index comprises an independent ledger for the blockchain that is specific to the cryptography-based, indexing application and the blockchain; determining a retention time for the internal state; comparing the retention time to a threshold retention time; and selecting the first block discovery routine in response to the retention time being below the threshold retention time.

E9. The method of any of embodiments E1-E8, further comprising: determining that a user account comprises assets related to a new block; and in response to determining that the user account comprises the assets related to the new block, selecting the first block discovery routine.

E10. The method of any of embodiments E1-E9, wherein converting the first data in the first data format to the second data format further comprises: generating metadata in the second data format, wherein the metadata indicates a blockchain standard corresponding to a token; and storing the metadata in the native index as an additional data field in a columnar database.

F1. A tangible, non-transitory, machine-readable medium storing instructions that, when executed by a data processing apparatus, cause the data processing apparatus to perform operations comprising those of any of embodiments A1-A13, B1-B10, C1-C10, D1-D10, or E1-E10.

F2. A system comprising one or more processors; and memory storing instructions that, when executed by the processors, cause the processors to effectuate operations comprising those of any of embodiments A1-A13, B1-B10, C1-C10, D1-D10, or E1-E10.

F3. A system comprising means for performing any of embodiments A1-A13, B1-B10, C1-C10, D1-D10, or E1-E10.

What is claimed is:

1. A system for selecting secure, encrypted communications across distributed computer networks for cryptography-based digital repositories in order to perform blockchain operations, the system comprising:
    a user device storing a first private key and a second partial private key;
    a first cryptography-based, storage application, wherein the first cryptography-based, storage application corresponds to the first private key;
    a second cryptography-based, storage application, wherein the second cryptography-based, storage application corresponds to a first partial private key and the second partial private key, wherein the first partial private key is stored on a remote device network;
    a blockchain node, wherein the blockchain node verifies batches of blockchain operations, and wherein each batch of the batches comprises a plurality of blockchain operations involving the first cryptography-based, storage application and the second cryptography-based, storage application; and
    a cryptography-based, indexing application, wherein the cryptography-based, indexing application:
    receives a first request to generate a queryable record of a subset of blockchain operations of a plurality of blockchain operations verified by the blockchain node;
    receives, from the blockchain node, data in a first data format corresponding to verified blockchain operations for a blockchain;
    compares a verified blockchain operation of the verified blockchain operations to a plurality of criteria to determine a respective ranking for the verified blockchain operation;
    compares the respective ranking to a threshold ranking;
    in response to determining that the respective ranking corresponds to the threshold ranking, selects the verified blockchain operation for the subset of blockchain operations;
    converts a portion of the data corresponding to the verified blockchain operation from the first data format to a second data format, wherein the second data format comprises the queryable record of the subset of blockchain operations;
    receives a second request to search the queryable record of the subset of blockchain operations; and
    in response to the second request, provides, on a user display interface, a confirmation of a creation, modification, or execution of a smart contract or asset transfer associated with the subset of blockchain operations.

2. A method for selecting secure, encrypted communications across distributed computer networks for cryptography-based digital repositories in order to perform blockchain operations, the method comprising:
    receiving, at a cryptography-based, indexing application, a first request to generate a queryable record of a subset of blockchain operations of a plurality of blockchain operations verified by a blockchain node;
    receiving, from the blockchain node, data in a first data format corresponding to verified blockchain operations for a blockchain;
    comparing a verified blockchain operation of the verified blockchain operations to a plurality of criteria to determine a respective ranking for the verified blockchain operation;

comparing the respective ranking to a threshold ranking;
in response to determining that the respective ranking corresponds to the threshold ranking, selecting the verified blockchain operation for the subset of blockchain operations;
converting a portion of the data corresponding to the verified blockchain operation from the first data format to a second data format, wherein the second data format comprises the queryable record of the subset of blockchain operations;
receiving, at the cryptography-based, indexing application, a second request to search the queryable record of the subset of blockchain operations; and
in response to the second request, providing, on a user display interface, a confirmation of a creation, modification, or execution of a smart contract or asset transfer associated with the subset of blockchain operations.

3. The method of claim 2, further comprising:
determining a rate at which new blocks are being added to the blockchain; and
determining the threshold ranking based on the rate.

4. The method of claim 2, further comprising:
determining a rate at which new blocks are being added to the blockchain; and
determining a number of criteria in the plurality of criteria based on the rate.

5. The method of claim 2, wherein comparing the verified blockchain operation of the verified blockchain operations to the plurality of criteria to determine the respective ranking for the verified blockchain operation further comprises:
generating a first call to the blockchain node, wherein the first call comprises a filtering parameter for the verified blockchain operation; and
in response to the first call, receiving a first response from the blockchain node, wherein the first response comprises the data, corresponding to the filtering parameter, in the first data format.

6. The method of claim 2, wherein comparing the verified blockchain operation of the verified blockchain operations to the plurality of criteria to determine the respective ranking for the verified blockchain operation further comprises:
retrieving a set of function selectors defined by an application binary interface for the blockchain;
determining a keyword based on the set of function selectors; and
determining whether the verified blockchain operation comprises the keyword.

7. The method of claim 2, wherein comparing the verified blockchain operation of the verified blockchain operations to the plurality of criteria to determine the respective ranking for the verified blockchain operation further comprises:
retrieving a blockchain component for the blockchain, wherein the blockchain component is specific to a given standard; and
determining whether the verified blockchain operation comprises the blockchain component.

8. The method of claim 2, wherein comparing the verified blockchain operation of the verified blockchain operations to the plurality of criteria to determine the respective ranking for the verified blockchain operation further comprises:
determining a blockchain component that enable division of a token; and
determining whether the verified blockchain operation comprises the blockchain component.

9. The method of claim 2, further comprising:
determining that a user account comprises assets in a first standard; and
in response to determining that the user account comprises the assets in the first standard, selecting a first criterion of the plurality of criteria that corresponds to the first standard.

10. The method of claim 2, further comprising:
determining a share of user accounts that comprise assets of a first standard;
comparing the share to a threshold share; and
in response determining that the share corresponds to the threshold share, selecting a first criterion of the plurality of criteria that corresponds to the first standard.

11. The method of claim 2, further comprising:
determining a number of blockchain operations for a user account that comprise assets in of a first standard;
comparing the number of blockchain operations to a threshold number; and
in response determining that the number of blockchain operations corresponds to the threshold number, selecting a first criterion of the plurality of criteria that corresponds to the first standard.

12. One or more non-transitory, computer-readable media comprising instructions that, when executed by one or more processors, causes operations comprising:
receiving, at a cryptography-based, indexing application, a first request to generate a queryable record of a subset of blockchain operations of a plurality of blockchain operations verified by a blockchain node;
receiving, from the blockchain node, data in a first data format corresponding to verified blockchain operations for a blockchain;
comparing a verified blockchain operation of the verified blockchain operations to a plurality of criteria to determine a respective ranking for the verified blockchain operation;
comparing the respective ranking to a threshold ranking;
in response to determining that the respective ranking corresponds to the threshold ranking, selecting the verified blockchain operation for the subset of blockchain operations;
converting a portion of the data corresponding to the verified blockchain operation from the first data format to a second data format, wherein the second data format comprises the queryable record of the subset of blockchain operations;
receiving, at the cryptography-based, indexing application, a second request to search the queryable record of the subset of blockchain operations; and
in response to the second request, providing, on a user display interface, a confirmation of a creation, modification, or execution of a smart contract or asset transfer associated with the subset of blockchain operations.

13. The one or more non-transitory, computer-readable media of claim 12, wherein the instructions cause further operations comprising:
determining a rate at which new blocks are being added to the blockchain; and
determining the threshold ranking based on the rate.

14. The one or more non-transitory, computer-readable media of claim 12, wherein the instructions cause further operations comprising:
determining a rate at which new blocks are being added to the blockchain; and
determining a number of criteria in the plurality of criteria based on the rate.

15. The one or more non-transitory, computer-readable media of claim 12, wherein comparing the verified blockchain operation of the verified blockchain operations to the plurality of criteria to determine the respective ranking for the verified blockchain operation further comprises:
generating a first call to the blockchain node, wherein the first call comprises a filtering parameter for the verified blockchain operation; and
in response to the first call, receiving a first response from the blockchain node, wherein the first response comprises the data, corresponding to the filtering parameter, in the first data format.

16. The one or more non-transitory, computer-readable media of claim 12, wherein comparing the verified blockchain operation of the verified blockchain operations to the plurality of criteria to determine the respective ranking for the verified blockchain operation further comprises:
retrieving a set of function selectors defined by an application binary interface for the blockchain;
determining a keyword based on the set of function selectors; and
determining whether the verified blockchain operation comprises the keyword.

17. The one or more non-transitory, computer-readable media of claim 12, wherein comparing the verified blockchain operation of the verified blockchain operations to the plurality of criteria to determine the respective ranking for the verified blockchain operation further comprises:
retrieving a blockchain component for the blockchain, wherein the blockchain component is specific to a given standard; and
determining whether the verified blockchain operation comprises the blockchain component.

18. The one or more non-transitory, computer-readable media of claim 12, wherein comparing the verified blockchain operation of the verified blockchain operations to the plurality of criteria to determine the respective ranking for the verified blockchain operation further comprises:
determining a blockchain component that enable division of a token; and
determining whether the verified blockchain operation comprises the blockchain component.

19. The one or more non-transitory, computer-readable media of claim 12, wherein the instructions cause further operations comprising:
determining that a user account comprises assets in a first standard; and
in response to determining that the user account comprises the assets in the first standard, selecting a first criterion of the plurality of criteria that corresponds to the first standard.

20. The one or more non-transitory, computer-readable media of claim 12, wherein the instructions cause further operations comprising:
determining a share of user accounts that comprise assets of a first standard;
comparing the share to a threshold share; and
in response determining that the share corresponds to the threshold share, selecting a first criterion of the plurality of criteria that corresponds to the first standard.

* * * * *